United States Patent
Park et al.

(10) Patent No.: US 11,153,857 B2
(45) Date of Patent: Oct. 19, 2021

(54) METHOD FOR PHYSICAL UPLINK CONTROL CHANNEL TRANSMISSION/RECEPTION BETWEEN TERMINAL AND BASE STATION IN WIRELESS COMMUNICATION SYSTEM, AND APPARATUS SUPPORTING SAME

(71) Applicant: LG ELECTRONICS INC., Seoul (KR)

(72) Inventors: Hanjun Park, Seoul (KR); Suckchel Yang, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/485,147

(22) PCT Filed: Feb. 12, 2018

(86) PCT No.: PCT/KR2018/001792
§ 371 (c)(1),
(2) Date: Aug. 9, 2019

(87) PCT Pub. No.: WO2018/147692
PCT Pub. Date: Aug. 16, 2018

(65) Prior Publication Data
US 2020/0045691 A1    Feb. 6, 2020

Related U.S. Application Data

(60) Provisional application No. 62/457,834, filed on Feb. 11, 2017, provisional application No. 62/475,842, (Continued)

(51) Int. Cl.
*H04W 72/04* (2009.01)
*H04L 5/00* (2006.01)
*H04L 12/24* (2006.01)

(52) U.S. Cl.
CPC ....... *H04W 72/0413* (2013.01); *H04L 5/0048* (2013.01); *H04L 41/0806* (2013.01); *H04W 72/0453* (2013.01)

(58) Field of Classification Search
CPC .......... H04W 72/0413; H04W 72/0453; H04L 5/0048; H04L 5/00; H04L 41/0806; H04L 27/34; H04L 27/38
See application file for complete search history.

(56) References Cited

U.S. PATENT DOCUMENTS 10,680,871 B2 *  6/2020  Zeng ................... H04L 27/2666
2011/0081932 A1  4/2011  Astely et al.
(Continued)

FOREIGN PATENT DOCUMENTS

WO    2016075475    5/2016

OTHER PUBLICATIONS

PCT International Application No. PCT/KR2018/001792, Written Opinion of the International Searching Authority dated Jun. 19, 2018, 23 pages.

(Continued)

*Primary Examiner* — Saumit Shah
(74) *Attorney, Agent, or Firm* — Lee, Hong, Degerman, Kang & Waimey

(57) ABSTRACT

Disclosed are a method for physical uplink control channel transmission/reception between a terminal and a base station in a wireless communication system, and an apparatus supporting the same. More particularly, a method for physical uplink control channel (PUCCH) transmission/reception between a terminal and a base station, disclosed herein, can reduce a peak-to-average power ratio (PAPR).

8 Claims, 17 Drawing Sheets

Related U.S. Application Data filed on Mar. 23, 2017, provisional application No. 62/480,440, filed on Apr. 1, 2017, provisional application No. 62/480,551, filed on Apr. 3, 2017, provisional application No. 62/481,086, filed on Apr. 3, 2017, provisional application No. 62/501,065, filed on May 3, 2017.

(56) References Cited

U.S. PATENT DOCUMENTS

| | | | |
|---|---|---|---|
| 2015/0009948 A1* | 1/2015 | Raaf | H04W 88/02 370/330 |
| 2016/0100433 A1* | 4/2016 | Vajapeyam | H04L 5/00 370/329 |
| 2016/0261325 A1 | 9/2016 | Ko et al. | |
| 2018/0220415 A1* | 8/2018 | Yin | H04W 72/0413 |
| 2019/0222254 A1* | 7/2019 | Kim | H04L 5/1469 |
| 2019/0335449 A1* | 10/2019 | Xiong | H04L 1/1671 |
| 2019/0386795 A1* | 12/2019 | Matsumura | H04L 5/0012 |
| 2020/0322199 A1* | 10/2020 | Matsumura | H04L 5/0048 |

OTHER PUBLICATIONS

Huawei, et al., "Short duration PUCCH for small to medium payload sizes", 3GPP TSG RAN WG1 Meeting #88, R1-1701646, Feb. 2017, 6 pages.

Ericsson, "On short PUCCH enabling fast ACK/NACK", 3GPP TSG RAN WG1 Meeting #88, R1-1703298, Feb. 2017, 5 pages.

European Patent Office Application Serial No. 18751719.8, Search Report dated Nov. 20, 2020, 9 pages.

Nokia et al., "On the short PUCCH for small UCI payloads", R1-1703318, 3GPP TSG RAN WG1#88, Feb. 2017, 6 pages.

* cited by examiner $S_x$, { x = 0, 1, ... } : sequence
$d_m$ : modulated data symbol $S_x$, { x = 0, 1, ... } : sequence
$d_m$ : modulated data symbol

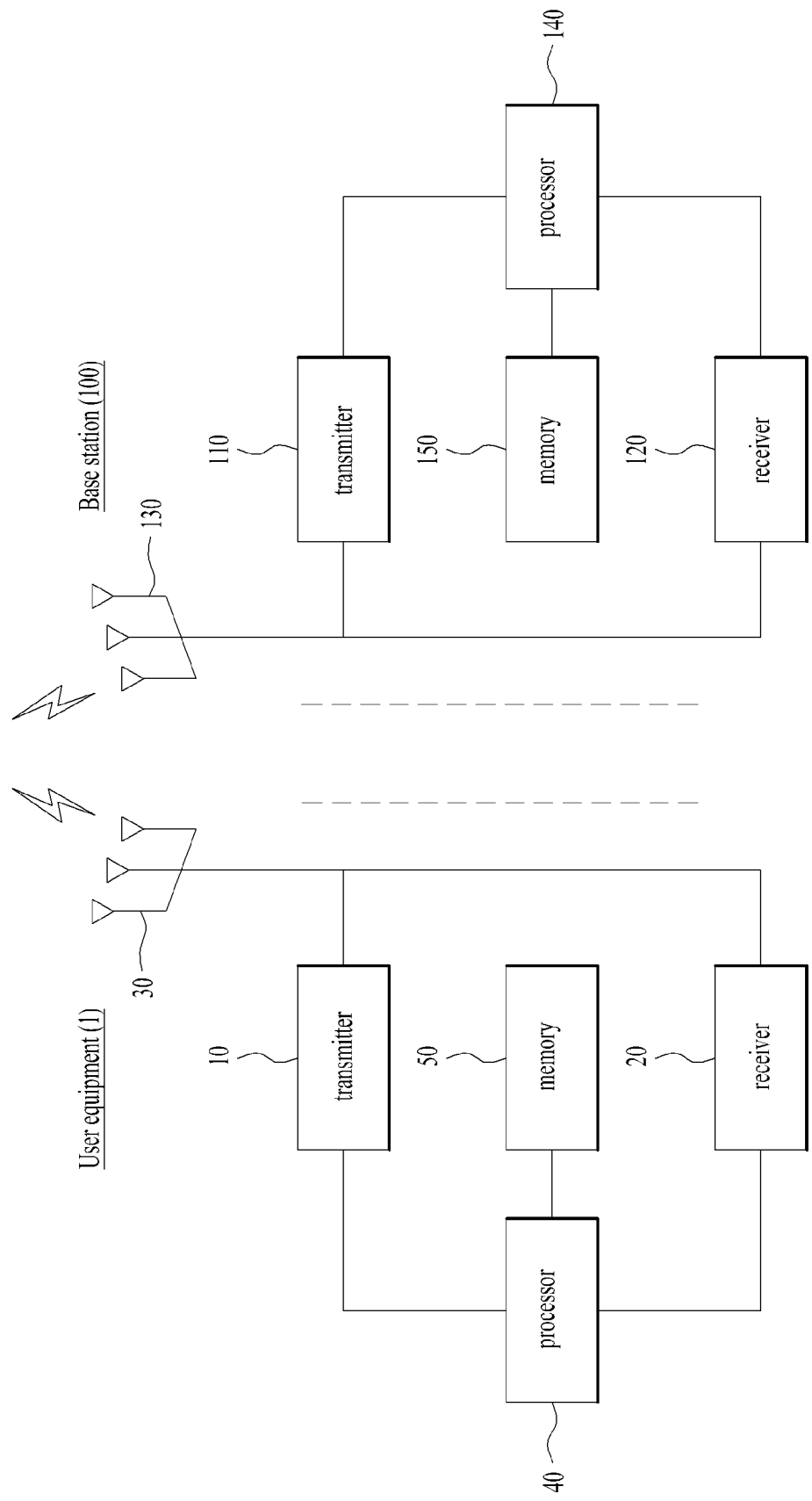

METHOD FOR PHYSICAL UPLINK CONTROL CHANNEL TRANSMISSION/RECEPTION BETWEEN TERMINAL AND BASE STATION IN WIRELESS COMMUNICATION SYSTEM, AND APPARATUS SUPPORTING SAME

CROSS-REFERENCE TO RELATED APPLICATIONS

This application is the National Stage filing under 35 U.S.C. 371 of International Application No. PCT/KR2018/001792, filed on Feb. 12, 2018, which claims the benefit of U.S. Provisional Application Nos. 62/457,834, filed on Feb. 11, 2017, 62/475,842, filed on Mar. 23, 2017, 62/480,440, filed on Apr. 1, 2017, 62/480,551, filed on Apr. 3, 2017, 62/481,086, filed on Apr. 3, 2017, and 62/501,065, filed on May 3, 2017, the contents of which are all hereby incorporated by reference herein in their entireties.

TECHNICAL FIELD

The present disclosure relates to a wireless communication system, and more particularly, to a method for physical uplink control channel (PUCCH) transmission and reception between a terminal and a base station in a wireless communication system supporting various numerologies and apparatus for supporting the same.

More specifically, the present disclosure is directed to a method for PUCCH transmission and reception between a terminal and a base station, which is capable of reducing the peak-to-average power ratio (PAPR).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

The object of the present disclosure is to provide a method for PUCCH transmission and reception between a terminal and a base station in a newly proposed communication system.

Specifically, the object of the present disclosure is to provide a method for PUCCH transmission and reception between a terminal and a base station, which is capable of reducing the PAPR.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides methods and devices for PUCCH transmission and reception between a terminal (user equipment) and a base station in a wireless communication system.

In an aspect of the present disclosure, provided herein is a method of transmitting a physical uplink control channel (PUCCH) to a base station (BS) by a user equipment (UE) in a wireless communication system. The method may include configuring the PUCCH by repeating N times a resource group in which N pieces of data are frequency division multiplexed (FDM) in a frequency domain in each of at least one symbol (where N is an integer greater than 1); and transmitting the configured PUCCH in the at least one symbol after applying phase rotations with different angles to the N pieces of data, respectively.

In another aspect of the present disclosure, provided herein is a user equipment (UE) for transmitting a physical uplink control channel (PUCCH) to a base station (BS) in a wireless communication system. The UE may include: a transmitter; and a processor connected to the transmitter. The processor may be configured to: configure the PUCCH by repeating N times a resource group in which N pieces of data are frequency division multiplexed (FDM) in a frequency domain in each of at least one symbol (where N is an integer greater than 1); and transmit the configured PUCCH in the at least one symbol after applying phase rotations with different angles to the N pieces of data, respectively.

The N pieces of data may include M demodulation reference signals (DM-RSs) and (N-M) pieces of uplink control information (where M is an integer).

When M is 1, one DM-RS may be transmitted in the at least one symbol after a phase rotation of zero degrees is applied to the one DM-RS.

The N pieces of data may be respectively allocated to resource elements (REs) spaced at a predetermined subcarrier spacing in the resource group and FDM with each other in each of at least one symbol.

Configuring the PUCCH by repeating N times the resource group in the frequency domain may include configuring the PUCCH by repeating N times the resource group on consecutive resources in the frequency domain.

When N is 2, the N pieces of data may include one demodulation reference signal (DM-RS) and one piece of uplink control information. In this case, in each of the at least one symbol, the number of resources allocated for the one piece of uplink control information in the resource group is equal to or greater than the number of resources allocated for the one DM-RS in the resource group.

The number of the at least one symbol may be 1 or 2.

In still another aspect of the present disclosure, provided herein is a method of receiving a physical uplink control channel (PUCCH) from a user equipment (UE) by a base station (BS) in a wireless communication system. The method may include: receiving the PUCCH in at least one symbol, wherein the PUCCH is configured by repeating N times a resource group in which N pieces of data are frequency division multiplexed (FDM) in a frequency domain in each of the at least one symbol (where N is an integer greater than 1); and decoding the N pieces of data received in the at least one symbol by applying phase rotations with different angles to the N pieces of data, respectively.

In a further aspect of the present disclosure, provided herein is a base station (BS) for receiving a physical uplink control channel (PUCCH) from a user equipment (UE) in a wireless communication system. The BS may include: a receiver; and a processor connected to the receiver. The processor may be configured to: receive the PUCCH in at least one symbol, wherein the PUCCH is configured by repeating N times a resource group in which N pieces of data are frequency division multiplexed (FDM) in a frequency domain in each of the at least one symbol (where N is an integer greater than 1); and decode the N pieces of data received in the at least one symbol by applying phase rotations with different angles to the N pieces of data, respectively.

In this case, decoding, by the BS, the N pieces of data received in the at least one symbol may include obtaining, by the BS, M demodulation reference signals (DM-RSs) and obtaining (N-M) pieces of uplink control information based on the phase rotations with the different angles respectively applied to the M DM-RSs and the (N-M) pieces of uplink control information (where M is an integer).

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present disclosure, a UE can transmit a PUCCH with a low PAPR to a BS, and the BS can receive the PUCCH with the low PAPR from the UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 23 is a diagram the configurations of a UE and a BS for implementing the proposed embodiments.

BEST MODE

Figure 1:
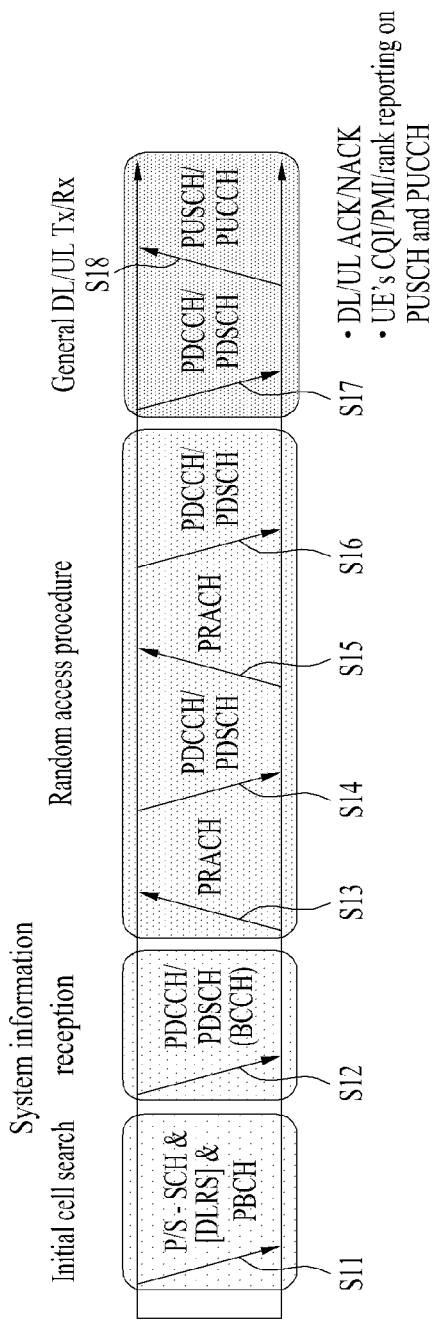
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNB (or gNode B) an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, a 3GPP2 system and 3GPP 5G NR system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
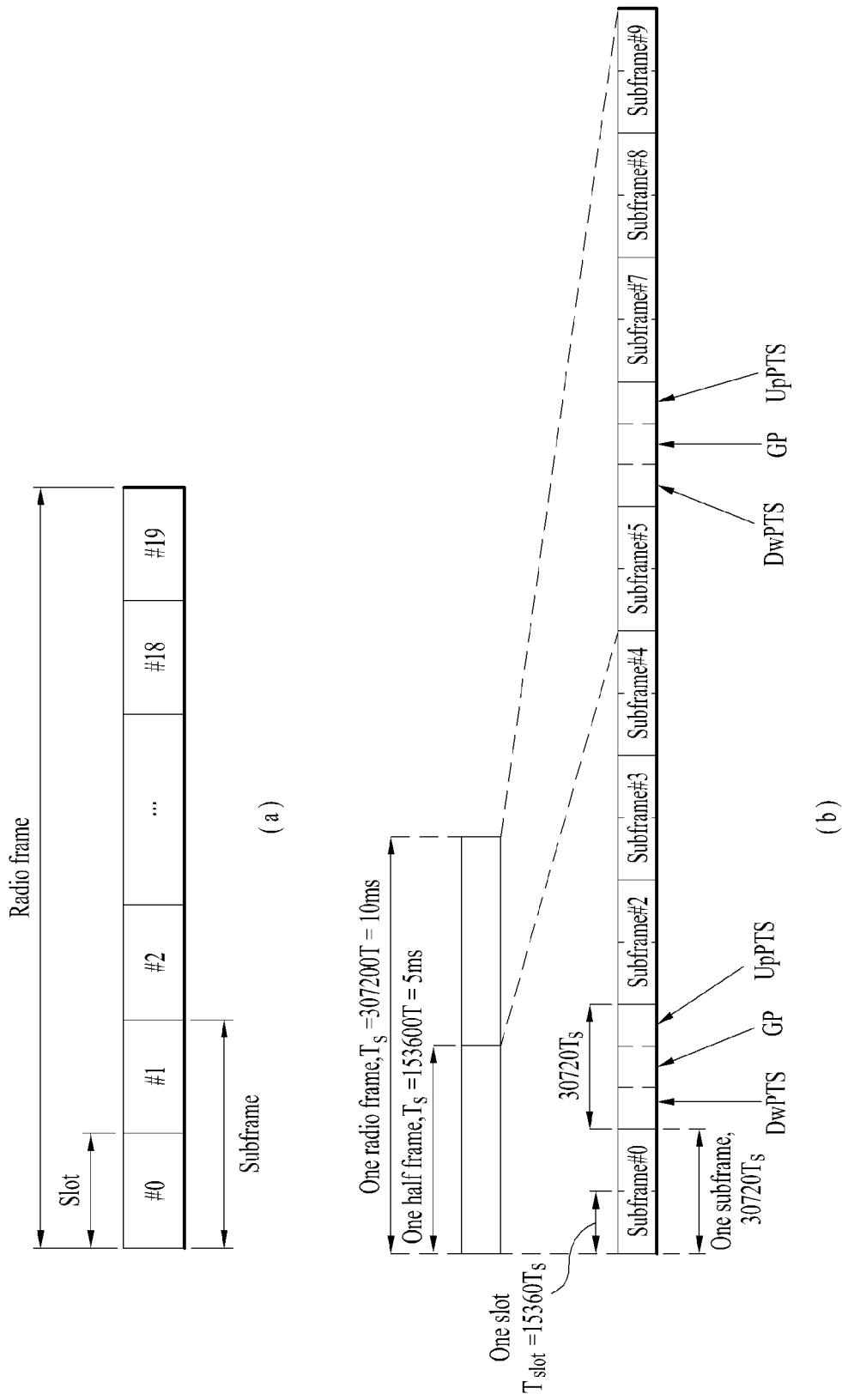
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
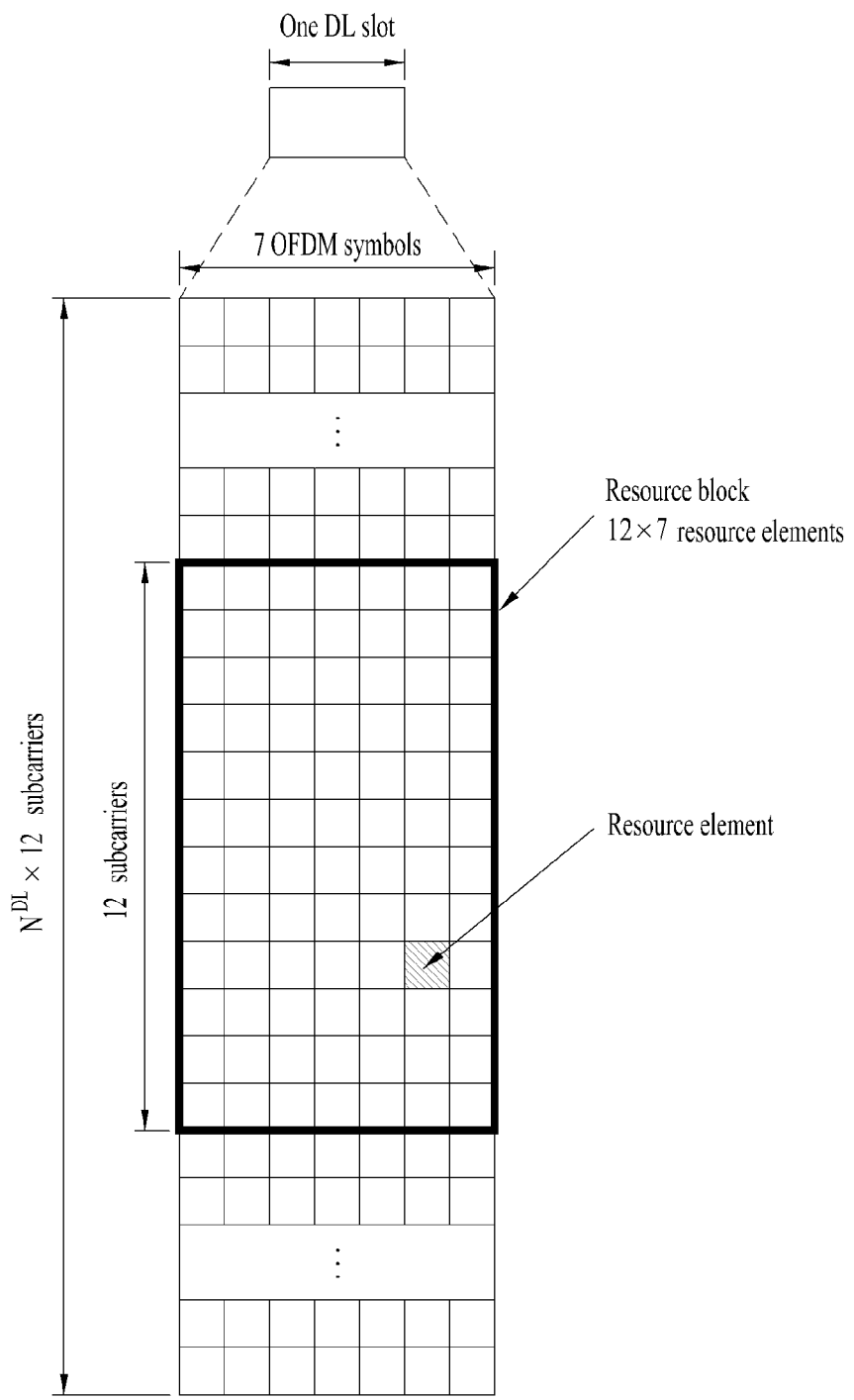
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
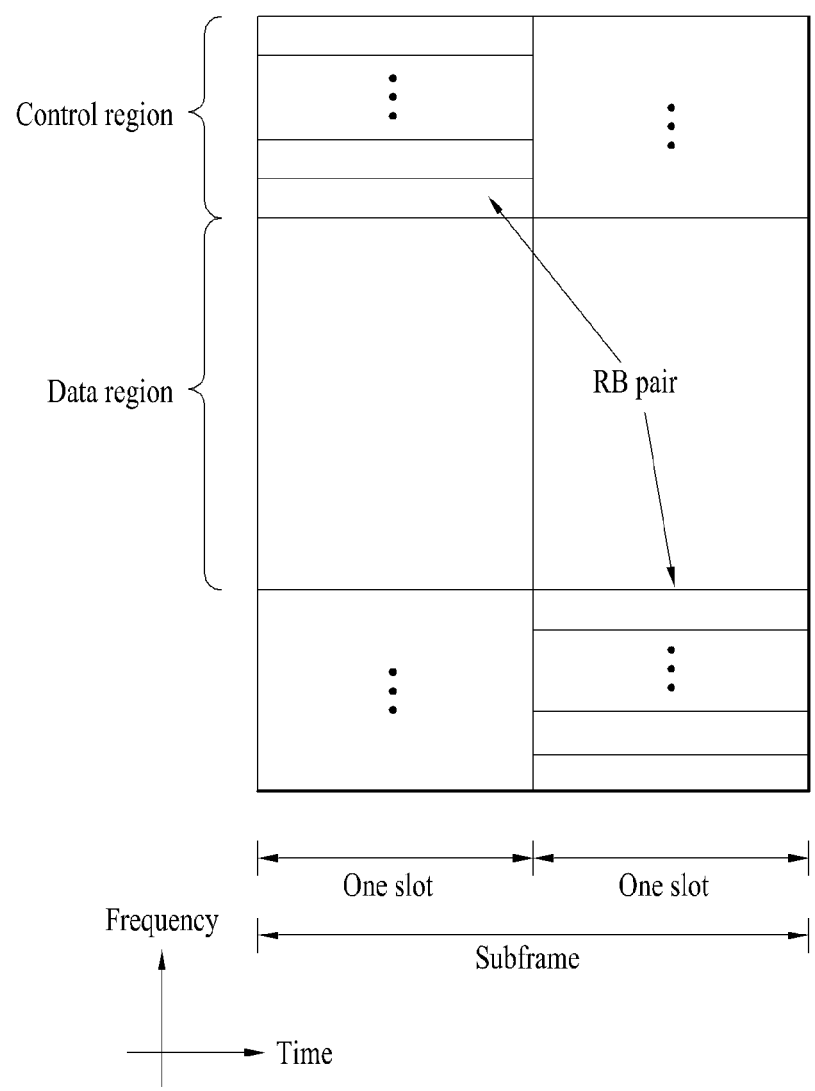
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
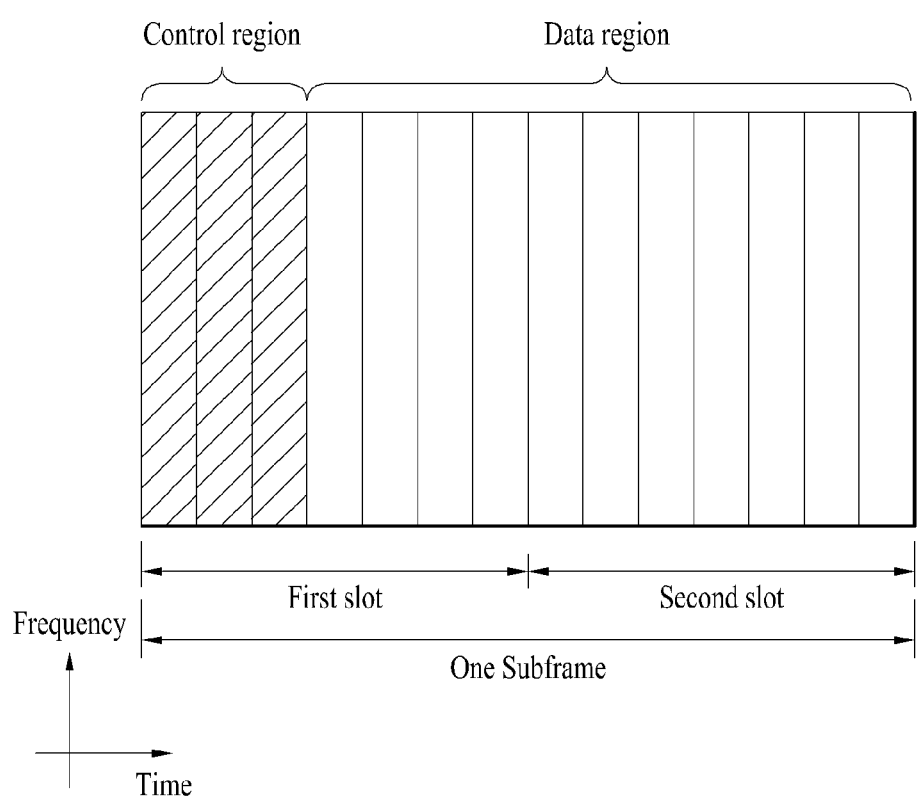
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other 01-DM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the BS may set a plurality of CSI processes for the UE and receive a report of the CSI for each process from the UE. Here, the CSI process is configured with a CSI-RS for specifying signal quality from the BS and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIB5. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 2

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 3 shows the number of OFDM symbols in each slot/frame/subframe in the case of the normal cyclic prefix, and Table 4 shows the number of OFDM symbols in each slot/frame/subframe in the case of the extended cyclic prefix.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
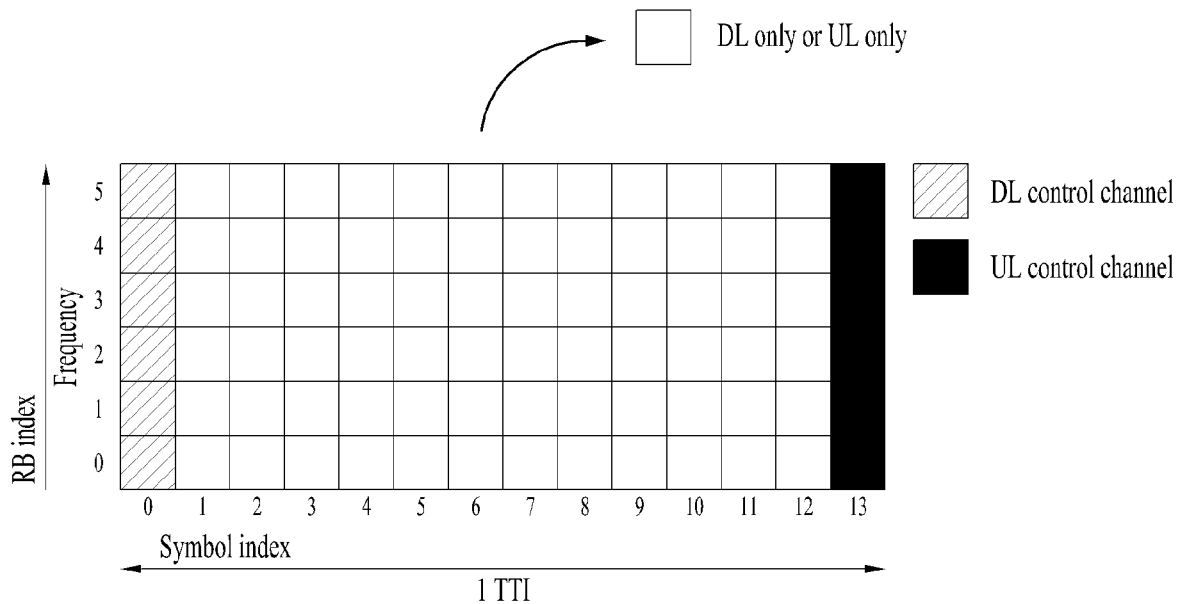
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
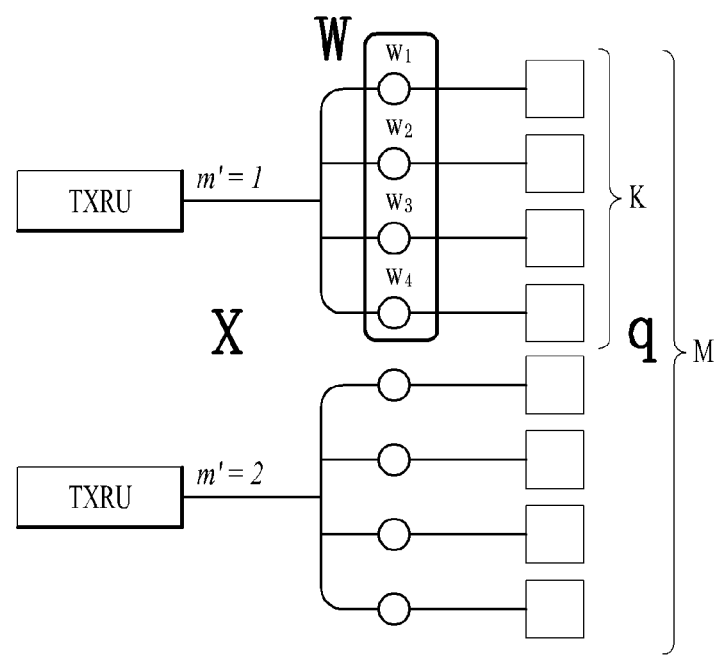
FIGS. 7 and 8 are diagrams illustrating representative methods for connecting TXRUs to antenna elements.
Figure 8:
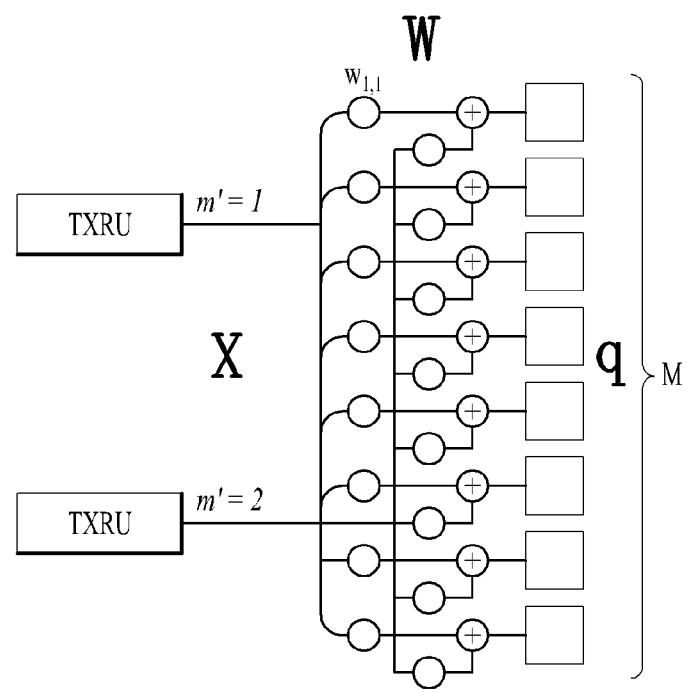

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 9:
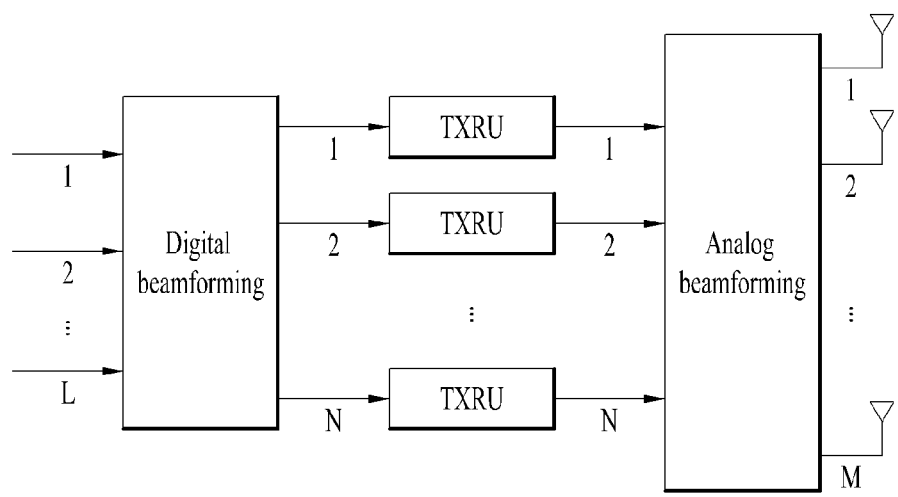
FIG. 9 is a diagram schematically illustrating an exemplary hybrid beamforming structure from the perspective of transceiver units (TXRUs) and physical antennas according to the present invention.

FIG. 9 is a diagram schematically illustrating an exemplary hybrid BF structure from the perspective of TXRUs and physical antennas according to the present invention. In FIG. 9, the number of digital beams is L and the number analog beams is N.

Additionally, in the NR system to which the present invention is applicable, an eNB designs analog BF to be changed in units of symbols to provide more efficient BF support to a UE located in a specific area. Furthermore, as illustrated in FIG. 9, when N specific TXRUs and M RF antennas are defined as one antenna panel, the NR system according to the present invention considers introducing a plurality of antenna panels to which independent hybrid BF is applicable.

In the case in which the eNB utilizes a plurality of analog beams as described above, the analog beams advantageous for signal reception may differ according to a UE. Therefore, in the NR system to which the present invention is applicable, a beam sweeping operation is being considered in which the eNB transmits signals (at least synchronization signals, system information, paging, and the like) by applying different analog beams in a specific subframe (SF) on a symbol-by-symbol basis so that all UEs may have reception opportunities.

Figure 10:
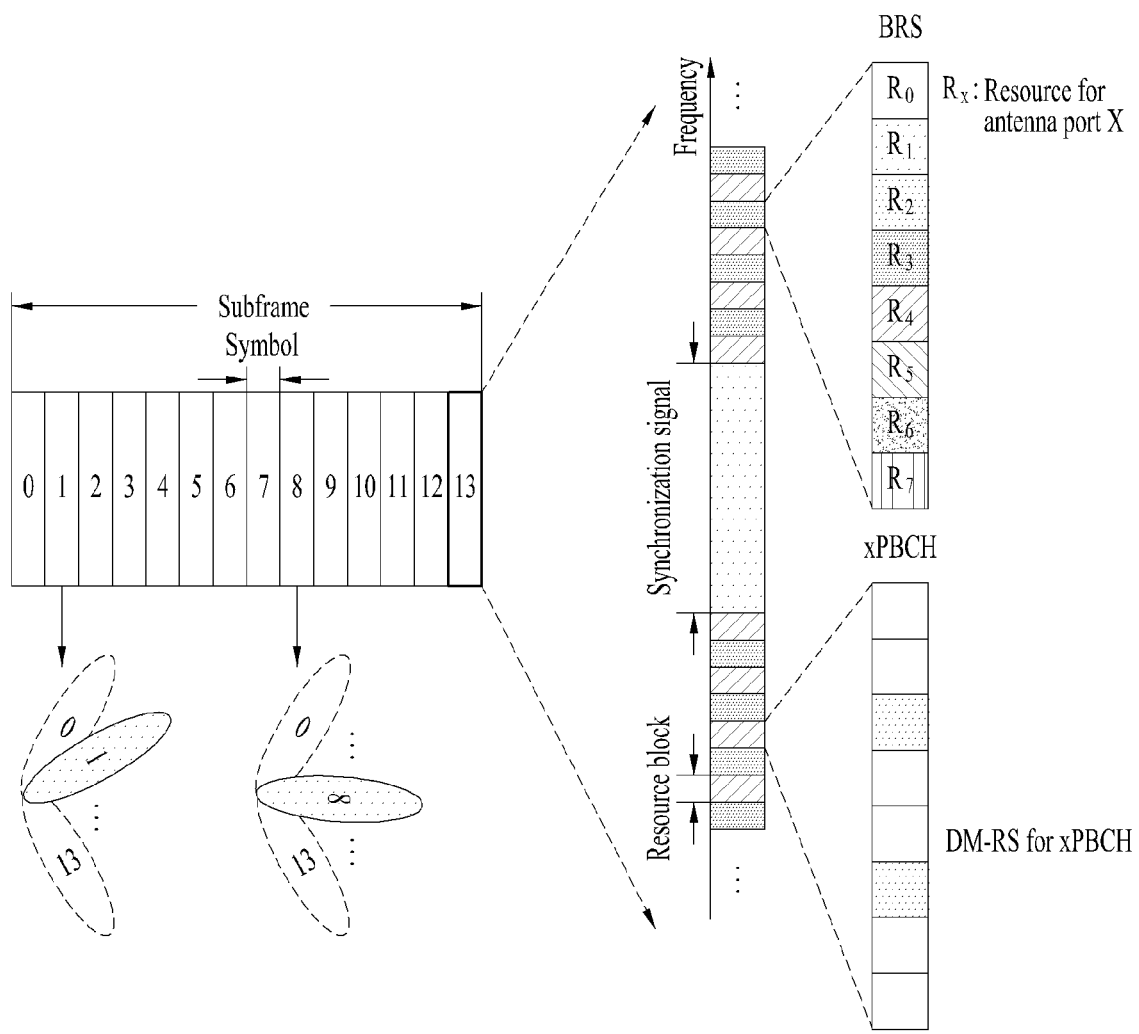
FIG. 10 is a diagram schematically illustrating an exemplary beam sweeping operation for a synchronization signal and system information in a downlink (DL) transmission procedure according to the present invention.

FIG. 10 is a diagram schematically illustrating an exemplary beam sweeping operation for a synchronization signal and system information in a DL transmission procedure according to the present invention.

In FIG. 10 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 10, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

3. Proposed Embodiments

Based on the above-described technical features, a description will be given of methods of designing a physical uplink control channel (PUCCH), which is a physical channel for transmitting a UL control signal, and transmitting the PUCCH.

3.1. PUCCH Transmission and Reception Method 1

In this section, a PUCCH design method capable of flexibly adjusting the ratio between reference signals (RSs) and uplink control information (UCI) in a PUCCH and a PUCCH transmission and reception method based thereon will be described in detail.

The NR system to which the present disclosure is applicable may use an OFDM scheme (or multiple access scheme) having an independent numerology for each time and frequency resource region.

In the NR system to which the present disclosure is applicable, a slot consisting of a plurality of OFDM symbols is defined as a basic time unit for data scheduling. To minimize the latency of transmitting a HARQ-ACK (or decoding result) in such a slot, a PUCCH, which is a physical channel for transmitting a UL control signal, may be time division multiplexed (TDM) with a data channel and then transmitted in a relatively short time period as shown in FIG. 6.

In the present disclosure, a PUCCH transmitted in a short time period corresponding to several OFDM symbols (e.g., one or two OFDM symbols) in a slot is named 'short PUCCH'. For example, the length of a short PUCCH may correspond to one or two OFDM symbols. In addition, after determining the HARQ-ACK (or decoding result) for DL data in a slot, a UE may transmit to a BS the HARQ-ACK (or decoding result) in rear OFDM symbols in the same slot over a short PUCCH.

When a short PUCCH carries important control information such as a HARQ-ACK, channel state information (CSI), a scheduling request (SR), etc., the short PUCCH needs to be designed to have high transmission power so that it can support wide UL coverage.

However, when a UE transmits an OFDM-based signal, the transmission power may be limited due to nonlinearity of a power amplifier (PA). For example, if the PAPR of a short PUCCH structure is high, the average power needs to be reduced such that the amplitude range of a signal transmitted in the time domain is within a range where the linearity of the PA is guaranteed (that is, the peak power value is included in the linear range of the PA). To this end, a design method capable of reducing the PAPR of a short PUCCH needs to be considered.

Meanwhile, a short PUCCH may have various UCI payload sizes from 1 bit (e.g., HARQ-ACK information for one transmission block (TB)) to several tens of bits (e.g., HARQ-ACK information for multiple TBs and CSI feedback information). In this case, the density of a demodulation reference signals (DM-RS), which is a reference signal for PUCCH demodulation, may be adjusted depending on the UCI payload size.

For example, when the UCI payload size is small, the DM-RS density may be increased to improve channel estimation performance since the coding rate is less affected by RS overhead.

On the contrary, when the UCI payload size is large, the DM-RS density may be decreased since the coding rate is more affected by RS overhead.

In this section, a short PUCCH design method capable of not only being applied to the NR system but also decreasing the PAPR and adjusting the ratio between RSs and UCI and a short PUCCH transmission and reception method based thereon will be described in detail.

Herein, dynamic control information (DCI) may mean a dynamic control signal. In addition, when OFDM resources are represented in a time and frequency grid, an RE may mean a resource corresponding to a specific subcarrier and a specific OFDM symbol. Moreover, a DM-RS may mean a reference signal that supports reception operation for data demodulation such as channel estimation, etc. Further, a slot may mean a basic time unit for data scheduling and be composed of a plurality of symbols. Additionally, as a minimum time unit for data scheduling, a mini-slot may be defined to have a shorter time period than that of a slot. In this case, a symbol may be an OFDM symbol or SC-FDMA symbol.

3.1.1. PUCCH Transmission and Reception Method 1-1

When the ratio of DM-RSs to UCI (in a specific symbol) on a short PUCCH is 1:N (where N is a positive integer), a UE may configure the short PUCCH (or part thereof) (in the OFDM symbol) as follows.

(1) An RE group (REG) composed of $M=K*(N+1)$ (consecutive) subcarriers (within a symbol) is defined.

(2) A sub-RE group (S-REG) composed of K REs is defined in the REG, and the REG is divided into (N+1) S-REGs. Each S-REG may be an interlace resource corresponding to a subcarrier set where the interval between adjacent subcarriers within a corresponding S-REG is N subcarriers. In this case, (N+1) interface resources may be configured by partitioning an REG based on interleaved frequency division multiplexing (IFDM).

(3) A DM-RS is allocated to one of the (N+1) S-REGs, and UCI is allocated to the remaining N S-REGs.

In the case of the DM-RS, a length-K sequence may be allocated to one S-REG.

In the case of the UCI, $K*N$ modulated (or modulation) symbols (where DFT spreading is applied) or N length-K CAZAC (constant amplitude zero autocorrelation) sequences may be allocated to the N S-REGs.

(4) The REG is repeated (or placed) (N+1) times (as consecutive resources) in the frequency domain.

(5) For a resource region consisting of $Q=M*(N+1)$ (consecutive) subcarriers, where the REG is repeatedly transmitted, if a specific RE is included in an n-th S-REG (e.g., n=1, 2, N+1) (within an REG including the corresponding RE) and the RE corresponds to a k-th (e.g., k=1, 2, ..., Q) subcarrier (which is sequentially numbered in the frequency domain) among Q subcarriers, a phase rotation proportional to n and k may be applied to a signal allocated to the corresponding RE. For example, the phase rotation of $\exp(j*\varphi)*\exp[j*2\pi*(n-1)*(k-1)/Q]$ may be applied to the signal allocated to the corresponding RE, where $\varphi$ is a constant.

In this case, signals allocated to the Q resource regions may mean signals allocated in the frequency domain before an X-point ($X \geq Q$) IFFT (inverse fast Fourier transform) process is performed.

In addition, the expression of "sequentially numbered in the frequency domain" may mean ascending order in the frequency domain.

More specifically, assuming that K=4 and N=2, an REG composed of M=4*(2+1)=12 (consecutive) subcarriers may be defined for one symbol. In this case, one REG may include 3 interlace resources where the interval between adjacent subcarriers is N=2 subcarriers, and each interlace resource may include K=4 subcarriers (or REs). A DM-RS sequence may be allocated to the first interlace resource, and N=2 UCI sequences may be allocated to the second and third interlace resource.

Thereafter, the UE may repeat a signal in the REG (N+1)=3 times in the frequency domain. The UE may apply no phase rotation to the DM-RS. However, in the case of the first UCI sequence, the UE may apply the phase rotation of exp[j*2π(*(r−1)/(K*(N+1))] to a signal allocated to an r-th (e.g., r=1, 2, . . . , K*(N+1)) subcarrier (sequentially numbered in the frequency domain) among subcarriers allocated for the first UCI. In the case of the second UCI sequence, the UE may apply the phase rotation of exp[j*2π*2*(r−1)/(K*(N+1))] to a signal allocated to an r-th (e.g., r=1, 2, . . . , K*(N+1)) subcarrier (sequentially numbered in the frequency domain) among subcarriers allocated for the second UCI.

Figure 11:
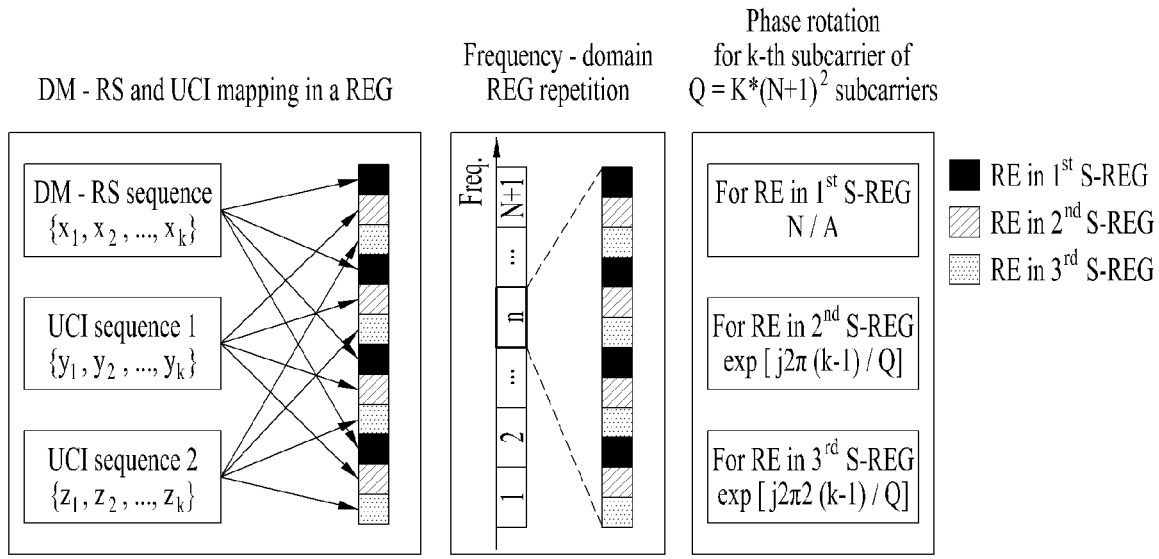
FIG. 11 is a diagram schematically illustrating a PUCCH design method suitable for PUCCH transmission and reception method 1-1 of the present disclosure.

FIG. 11 is a diagram schematically illustrating a PUCCH design method suitable for PUCCH transmission and reception method 1-1 of the present disclosure.

In FIG. 11, the relationship between the relative order r of a specific subcarrier among subcarriers included in an n-th interlace resource and the relative order k thereof among all subcarriers allocated for a short PUCCH may be given as follows: k=(N+1)*(r−1)+n. If k is set to exp(j*φ)*exp[j*2π(n−1)*(k−1)/Q], the value of k becomes equal to exp(j*ψ)*exp[j*2π*(n−1)*(r−1)/(K*(N+1))] as described above. In this case, since φ and ψ are constants, they are negligible.

When a short PUCCH (or some symbols of the short PUCCH) is transmitted as described above, the operation of repeating (N+1) times a signal allocated to an REG in the frequency domain may create (N+1) interlace resources for a time-domain signal where Q=M*(N+1) IDFT is applied. In addition, the operation of applying a different phase rotation to each S-REG may be interpreted as the operation of allocating the (N+1) interlace resources as different resources by applying cyclic time shifts to (N+1) signals (e.g., UCI, N DM-RS sequences) corresponding to (N+1) S-REGs.

If the UE performs the X-point (X≥Q) IFFT process for the signals allocated to the total Q subcarriers, the (N+1) signals may still be identified since the operation has only the oversampling effect. Thus, if the UE creates the UCI and/or DM-RS sequences such that each of them satisfies a low PAPR and then applies PUCCH transmission and reception method 1-1, the (N+1) signals can be distinguished in the time domain even though they are transmitted at the same time. Thus, the PAPR may not increase.

PUCCH transmission and reception method 1-1 may be applied together with other proposed methods of the present disclosure unless they collide with each other.

3.1.2. PUCCH Transmission and Reception Method 1-2

When the ratio of DM-RSs to UCI (in a specific symbol) on a short PUCCH is 1:N (where N is a positive integer), a UE may configure the short PUCCH (or part thereof) (in the OFDM symbol) as follows.

(1) An REG composed of M=K*(N+1) (consecutive) subcarriers (within a symbol) is defined.

(2) An S-REG composed of K REs is defined in the REG, and the REG is divided into (N+1) S-REGs. Each S-REG may mean an interlace resource corresponding to a subcarrier set where the interval between adjacent subcarriers within a corresponding S-REG is N subcarriers. In this case, (N+1) interface resources may be configured by partitioning an REG based on II-DM.

(3) A DM-RS is allocated to one of the (N+1) S-REGs, and UCI is allocated to the remaining N S-REGs.

In the case of the DM-RS, a length-K sequence may be allocated to one S-REG.

In the case of the UCI, K*N modulated symbols (where DFT spreading is applied) may be allocated to the N S-REGs.

(4) The REG is repeated (or placed) two times (as consecutive resources) in the frequency domain.

(5) For a resource region consisting of Q=2*M (consecutive) subcarriers, where the REG is repeatedly transmitted, if the UCI (or DM-RS) is allocated to a specific RE and the RE corresponds to a k-th (e.g., k=1, 2, . . . , Q) subcarrier (sequentially numbered in the frequency domain) among Q subcarriers, a phase rotation proportional to k may be applied to a signal allocated to the corresponding RE. For example, the phase rotation of exp(j*φ)*exp[j*2π(*(k−1)/Q] may be applied to the signal allocated to the corresponding RE, where φ is a constant.

In this case, signals allocated to the Q resource regions may mean signals allocated in the frequency domain before the X-point (X≥Q) IFFT process is performed.

In addition, the expression of "sequentially numbered in the frequency domain" may mean ascending order in the frequency domain.

When the ratio between UCI and DM-RSs is N:1 as described in section 3.1.1, the UE may generate (N+1) signals each satisfying a low PAPR in the time domain and allocate the (N+1) signals to (N+1) interlace (or comb) resources, which are orthogonal in the time domain, in order to reduce the overall PAPR of the signals. Although the method is advantageous in terms of the PAPR, the number of required subcarriers is proportional to $(N+1)^2$. That is, the method is disadvantageous in that a large amount of resources are required. In particular, in the case of UCI, the PAPR thereof is not significantly increased even if a result to which DFT spreading is applied is transmitted using different S-REGs divided from one REG. Thus, if UCI and an RS are designed to be distinguished in the time domain by modifying the method described in section 3.1.1, it may be desirable in terms of resource efficiency.

More specifically, assuming that K=4 and N=2, an REG composed of M=4*(2+1)=12 (consecutive) subcarriers may be defined for one symbol. In this case, one REG may include 3 interlace resources where the interval between adjacent subcarriers is N=2 subcarriers, and each interlace resource may include K=4 subcarriers (or REs). A DM-RS sequence may be allocated to the first interlace resource, and UCI to which the DFT spreading is applied may be allocated to the second and third interlace resource.

Thereafter, the UE may repeat a signal in the REG 2 times in the frequency domain. The UE may apply no phase rotation to the DM-RS. However, in the case of the UCI, the UE may apply the phase rotation of exp[j*2π(*(r−1)/(2*K)] to a signal allocated to an r-th (e.g., r=1, 2, . . . , 2*K) subcarrier (sequentially numbered in the frequency domain) among subcarriers allocated for the UCI.

Figure 12:
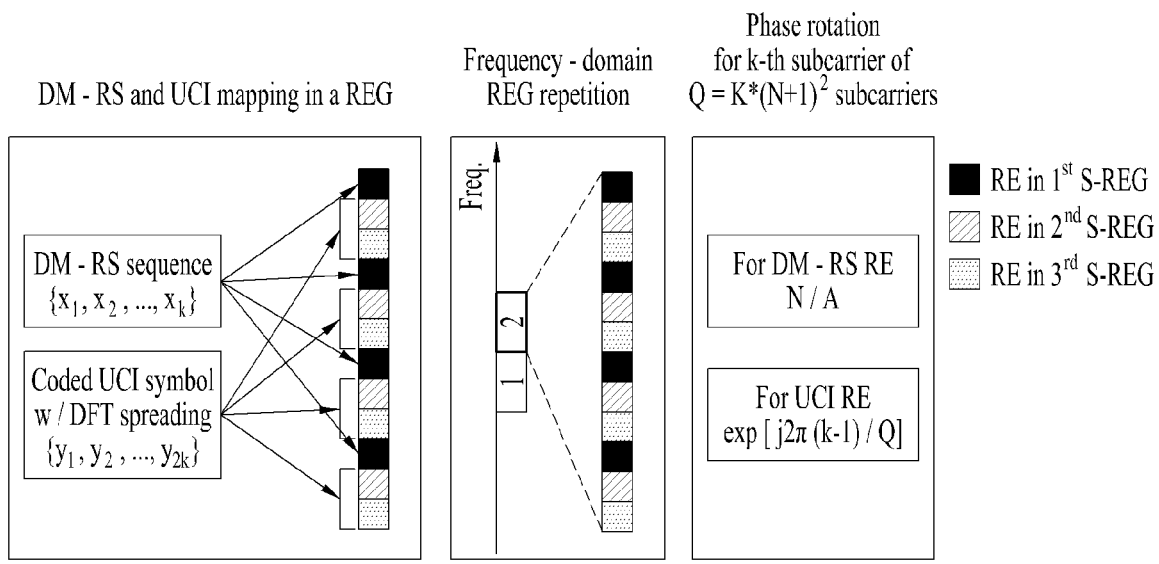
FIG. 12 is a diagram schematically illustrating a PUCCH design method suitable for PUCCH transmission and reception method 1-2 of the present disclosure.

FIG. 12 is a diagram schematically illustrating a PUCCH design method suitable for PUCCH transmission and reception method 1-2 of the present disclosure.

In FIG. 12, the relationship between the relative order r of a specific subcarrier among subcarriers for UCI transmission and the relative order k thereof among all subcarriers allocated for a short PUCCH may be given as follows: k=(N+1)*(r−1)+n. If k is set to exp(j*φ)*exp[j*2π*(*(k−1)/Q], the value of k becomes equal to exp(j*ψ)*exp[j*2π*(r−1)/(K*(N+1))] as described above. In this case, since φ and ψ are constants, they are negligible.

PUCCH transmission and reception method 1-2 may be applied together with other proposed methods of the present disclosure unless they collide with each other.

3.1.3. PUCCH Transmission and Reception Method 1-3

When a basic resource unit is defined to include M=K*(N+1) (consecutive) subcarriers (hereinafter it is referred to as a subcarrier group (SC-group)), a UE may transmit a short PUCCH (or part thereof) using P SC-groups. In this case, the UE may apply (M-point) DFT spreading, which matches with the number of SC-groups, to signals obtained by applying time division multiplexing (TDM) to K DM-RS samples and K*N UCI samples in each SC-group.

For signal transmission, the UE may create a frequency-domain signal from the signals for the total P SC-groups (after the DFT spreading per SC-group) and converts it into a time-domain signal by performing an IFFT process.

In addition, the DFT vector value(s) applied to DM-RSs when the UE performs the DFT spreading per SC-group may be provided to the UE according to one of the following methods.

(1) The DFT vector value(s) (per SC-group) are predetermined.

(2) The DFT vector value(s) (per SC-group) are configured through a higher layer signal.

(3) The DFT vector value(s) (per SC-group) are configured through a dynamic control signal.

In this case, the UE may estimate the average channel gain per SC-group by de-spreading the DFT vector(s) applied to the DM-RSs per SC-group (that is, by applying the Hermitian matrix of a corresponding DFT vector).

In addition, the same DM-RS and UCI may be repeatedly transmitted in the P SC-groups, or different DM-RSs and UCI may be transmitted in the P SC-groups. An independent phase value may be applied to each of the P SC-groups.

Further, when the UE performs the DFT spreading per SC-group, the DFT vector(s) applied to the DM-RSs per SC-group may be different from each other.

More specifically, when M=12 subcarriers are defined as one SC-group and N=3, the UE may create a signal having 3 DM-RS samples and 9 UCI samples in the time domain. The UE may create a frequency-domain signal by applying the M-point DFT spreading (or DFT spreading) to a length-M time-domain signal created per SC-group. After combining signals from the total P SC-groups in the frequency domain, the UE may create a time-domain signal by performing the IFFT process thereon and then transmit the created time-domain signal.

Although the PAPR may increase in the above process while P of the single carriers are combined, the PAPR may be reduced compared to when P*M signals are combined.

Figure 13:
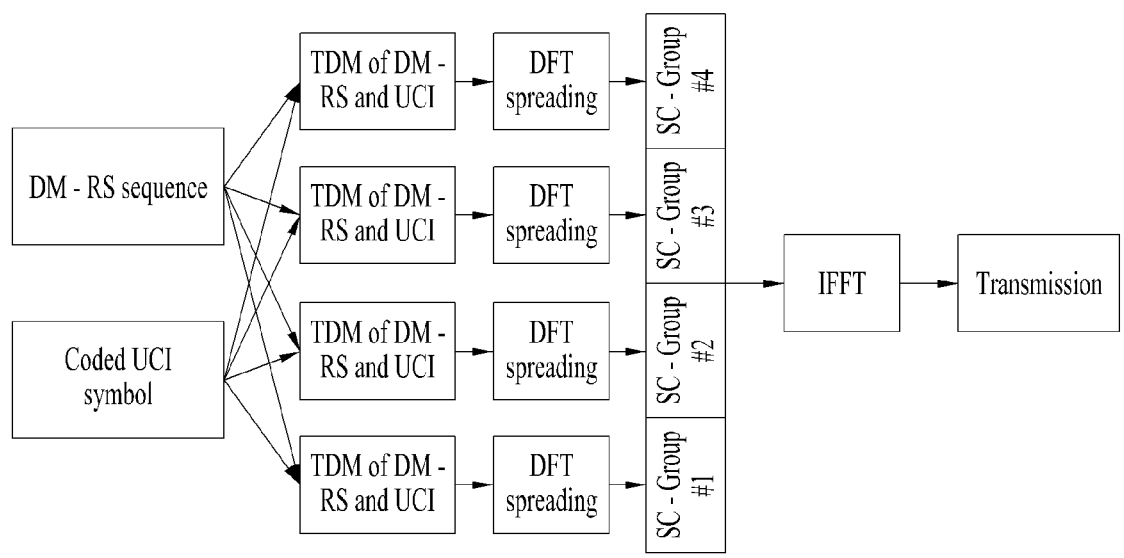
FIG. 13 is a diagram schematically illustrating a PUCCH design method suitable for PUCCH transmission and reception method 1-3 of the present disclosure.

FIG. 13 is a diagram schematically illustrating a PUCCH design method suitable for PUCCH transmission and reception method 1-3 of the present disclosure (where P=4, i.e., 4 SC-groups).

Assuming that the channel gain for an SC-group does not significantly vary for each subcarrier, the M-point DFT spreading may be interpreted to mean that the UCI and DM-RS are transmitted using different orthogonal codes. In this case, since the orthogonal code becomes a column vector of a DFT matrix, signals in the SC-group may be configured such that they do not overlap with each other in the time domain as much as possible.

Thus, if the UE knows which DFT vector is applied to the DM-RS when estimating the channel gain for the SC-group, the UE may estimate the average channel gain (for a plurality of subcarriers) in the SC-group by de-spreading the corresponding DFT vector (i.e., by applying Hermitian of the corresponding DFT vector). In this case, the DFT vector (per SC-group) applied to the DM-RS may be predetermined. Alternatively, a BS may transmit information on the DFT vector through a higher layer signal or a dynamic control signal (e.g., DCI).

PUCCH transmission and reception method 1-3 may be applied together with other proposed methods of the present disclosure unless they collide with each other.

3.1.4. PUCCH Transmission and Reception Method 1-4

When a short PUCCH (or part thereof) is transmitted based on discrete Fourier transform-spread-OFDM (DFT-s-OFDM), a UE may configure the short PUCCH as follows.

The UE may configure a length-M time-domain signal by performing TDM of a DM-RS and UCI, performs M-point DFT spreading (or DFT precoding), and then perform oversampling through an N-point (e.g., N≥M) IFFT (or IDFT) process. In this case, the UE may configure the length of a guard period (GP) between the DM-RS and UCI (or a cyclic prefix (CP) of the DM-RS and/or UCI) according to one of the following methods.

(1) The absolute time $T_0$ corresponding to the GP (or CP) length may be predetermined by the UE and a BS. The UE may set L=ceil($T_0$/[(N/M)*$T_s$]) samples among M samples for the time-domain signal before the DFT spreading (or DFT precoding) to the GP (or CP) length.

(2) The absolute time $T_0$ corresponding to the GP (or CP) length may be configured by the BS through a higher layer signal. The UE may set the L=ceil($T_0$/[(N/M)*$T_s$]) samples among the M samples for the time-domain signal before the DFT spreading (or DFT precoding) to the GP (or CP) length.

(3) For each size of a frequency resource region that can be allocated for short PUCCH transmission, the GP (or CP) length (in terms of the number of samples before the DFT spreading) may be predetermined by the BS and UE.

(4) For each size of a frequency resource region that can be allocated for the short PUCCH transmission, the GP (or CP) length (in terms of the number of samples before the DFT spreading) may be configured by the BS through a higher layer signal.

In this case, $T_s$ may mean the sampling time of a time-domain (OFDM) signal transmitted after IFFT (or IDFT). In addition, the ceil( ) function may mean a round-up function.

The BS may determine whether the GP between the DM-RS and UCI (or the CP for the DM-RS and/or UCI) is used.

More specifically, when generating a specific symbol of the short PUCCH, the UE may perform the TDM of the DM-RS and UCI in the time domain and then apply the DFT spreading thereto to obtain single-carrier characteristics. Thereafter, the UE may transmit the corresponding signal on the channel by performing the IFFT process and attaching the CP thereto.

By applying FFT and DFT de-spreading during reception, the BS may know that the DM-RS and UCI are multiplexed by TDM in the time domain.

In this case, if there is no guard time between the DM-RS and UCI, interference may occur between the DM-RS and UCI due to the channel time delay characteristics. Thus, the guard time should be introduced between the DM-RS and UCI.

However, as the amount of frequency-domain resources allocated for the short PUCCH increases, the sampling rate may also increase. As a result, the number of samples in the digital domain used for representing the guard time may vary (even when the same guard time is formed in terms of absolute time).

In other words, the number of samples for representing the GP (or CP) with a specific absolute length may vary depending on the amount of allocated resources. Thus, the BS may inform the UE of the absolute time of the GP (or CP) or the number of samples for configuring the GP (or CP) length per amount of resources. Whether the GP (or CP) length is represented using the absolute time or the number of samples depending on frequency resource regions may be predetermined by the BS and UE.

PUCCH transmission and reception method 1-4 may be applied together with other proposed methods of the present disclosure unless they collide with each other.

3.1.5. PUCCH Transmission and Reception Method 1-5

When a DM-RS and UCI (in a specific symbol) on a short PUCCH are multiplexed by frequency division multiplexing (FDM) and DFT spreading (or DFT precoding) is applied to the UCI, a UE may change a DM-RS pattern for the short PUCCH (in the corresponding symbol) depending on whether FDM of the short PUCCH with a sounding reference signal (SRS) is supported (in the corresponding symbol).

In this case, a BS may inform whether the FDM of the short PUCCH and SRS is supported in the specific symbol using a higher layer signal (e.g., RRC signaling) or a dynamic control signal (e.g., DCI). The BS may also configure the DM-RS pattern for the short PUCCH in the specific symbol through a higher layer signal (e.g., RRC signaling) or a dynamic control signal (e.g., DCI).

In general, an FFT/IFFT process can be supported when the size thereof is a multiple of 2, 3 or 5 depending on circuit design.

Accordingly, when the DM-RS and UCI are frequency division multiplexed (FDM) in the specific symbol of the short PUCCH, the number of UCI transmission REs except DM-RS transmission REs should be a multiple of 2, 3 or 5 for the FFT/IFFT process. For example, when a frequency resource region for the short PUCCH is allocated with a basic unit composed of 12 subcarriers, the number of DM-RS REs in the basic unit may be one of {2, 3, 4, 6} if the DM-RS density is assumed to be equal to or less than ½. In this case, the number of UCI transmission REs in the basic unit becomes a multiple of 2, 3 or 5. Thus, when resources for the short PUCCH are allocated, all frequency-domain resource allocation methods corresponding to multiples of 2, 3 or 5 and the basic unit can be supported.

However, if a short PUCCH resource and an SRS resource are FDM in the specific symbol, specific REs (in the corresponding symbol) on the short PUCCH may not be available for SRS transmission. As a result, considering REs not available for multiplexing with the SRS (in the corresponding symbol), the number of DM-RS REs needs to be adjusted such that the total number of UCI REs for the short PUCCH becomes a multiple of 2, 3 or 5.

For example, assuming that 2 REs are reserved for multiplexing with the SRS in each basic unit when the frequency resource region for the short PUCCH is allocated with the basic unit composed of 12 subcarriers, if the DM-RS density is equal to or less than ½, the number of DM-RS REs in the basic unit may be one of {1, 2, 4, 5}.

That is, this is different from the number of DM-RS REs when the SRS is not considered, one of {2, 3, 4, 6}. Thus, the DM-RS pattern for the short PUCCH may be changed (in the specific symbol) depending on whether the FDM of the short PUCCH and SRS is supported (in the corresponding symbol).

The above configuration can be generalized as follows. When a DM-RS and UCI (in a specific symbol) on a short PUCCH is multiplexed by FDM and DFT spreading (or DFT precoding) is applied to the UCI, some REs (in the corresponding symbol) on the short PUCCH may not be used for multiplexing with another signal. In this case, a UE may set the number of UCI transmission REs on the short PUCCH to a multiple of 2, 3, or 5 by changing a DM-RS pattern (in the corresponding symbol). Depending on whether there is a reserved RE on the short PUCCH, supportable DM-RS density may be changed. For example, if a BS informs whether the reserved RE is present on the short PUCCH, the UE may implicitly assume that the DM-RS pattern applied to the short PUCCH is changed.

PUCCH transmission and reception method 1-5 may be applied together with other proposed methods of the present disclosure unless they collide with each other.

3.2. PUCCH Transmission and Reception Method 2

In this section, a PUCCH design method capable of increasing multiplexing capacity of a PUCCH when the PUCCH is composed of one or several OFDM symbols and a PUCCH transmission and reception method based thereon will be described in detail.

As described above, a PUCCH transmitted in a short time period corresponding to several OFDM symbols (e.g., one or two OFDM symbols) in a slot is named 'short PUCCH'.

If the slot for the short PUCCH is a DL-centric slot for carrying DL data (for example, a slot where the number of DL symbols is more than the number of UL symbols, and more particularly, a slot where last two symbols are set to UL symbols), the short PUCCH may be transmitted in a limited number of OFDM symbols in the slot. Thus, multiplexing of a plurality of short PUCCHs needs to be supported in terms of efficient use of resources.

If only FDM and/or TDM are allowed for short-PUCCH multiplexing, the number of resources available for short PUCCH transmission in the DL-centric slot may be significantly limited. Thus, code division multiplexing (CDM) may be considered for the short-PUCCH multiplexing.

In the NR system to which the present disclosure is applicable, a method of supporting multiple ratios between RSs and UCI (RS/UCI ratio) for a short PUCCH is considered. For example, the RSs and UCI on the short PUCCH may be multiplexed by FDM, and the RS/UCI ratio may be set equal to or more than 1 (e.g., 1:1, 1:3, etc.).

In this section, a method by which a UE multiplexes short PUCCHs with different RS/UCI ratios based on CDM when the short PUCCH is configured with sequences will be described in detail.

3.2.1. PUCCH Transmission and Reception Method 2-1

A UE may configure a length-N (=L*M) PUCCH resource by interleaving M length-L sequences. In this case, the UE may use K (<M) sequences among the M sequences for an RS and multiply each of the remaining (M-K) sequences by an (independent) modulated symbol for UCI for transmission thereof.

In this case, a BS may configure the number of sequences in the length-N PUCCH resource, M through a higher layer signal (e.g., RRC signaling) or a dynamic control signal (e.g., DCI).

Among the M sequences, the K sequences used for the RS may be predetermined. Alternatively, the BS may configure the K sequences through a higher layer signal (e.g., RRC signaling) or a dynamic control signal (e.g., DCI).

Each length-L sequence may correspond to an OCC or a CAZAC sequence (e.g., Zadoff-Chu sequence). In this case, a different OCC or CS may be applied to each PUCCH resource (per sequence).

Assuming that the number of sequences used for the RS (or UCI transmission) among the M sequences is P (where P>1), the P sequences may be obtained by applying a length-P OCC to the same sequence. That is, when the length-P OCC is represented by O(p) (where p=0, 1, . . . , P−1), transmission may be performed by multiplying a p-th sequence (p=0, 1, . . . , P−1) among the P sequences used for the RS (or UCI transmission) by the value of O(p).

Figure 14:
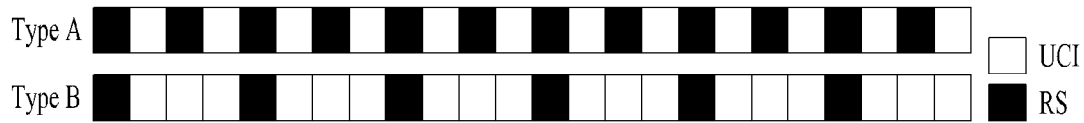
FIG. 14 is a diagram schematically illustrating a short PUCCH (type A) with an RS/UCI ratio of 1:1 and a short PUCCH (type B) with an RS/UCI ratio of 1:3.

FIG. 14 is a diagram schematically illustrating a short PUCCH (type A) with an RS/UCI ratio of 1:1 and a short PUCCH (type B) with an RS/UCI ratio of 1:3.

In the NR system to which the present disclosure is applicable, it is assumed that an RS(s) and UCI on a short PUCCH are multiplexed based on FDM and the RS/UCI ratio for the short PUCCH is 1:1 or 1:2. FIG. 14 shows the short PUCCH (type A) with the RS/UCI ratio of 1:1 and the short PUCCH (type B) with the RS/UCI ratio of 1:3 in the case of a length-N (N=24) PUCCH.

Considering the RSs and UCI of short PUCCH type A and short PUCCH type B, it is difficult to apply CDM since each has a different amount of resources. Thus, to apply the CDM between short PUCCH type A and short PUCCH type B, a method of supporting a different RS/UCI ratio by configuring a plurality of sequences with the same length for the two types of PUCCHs and adjusting the ratio of RS sequences to UCI sequences in each type of PUCCH may be considered. In other words, the UE may configure the length-N (=L*M) PUCCH resource by interleaving the M length-L sequences, use the K (<M) sequences among the M sequences for the RS, and multiply each of the remaining (M-K) sequences by the (independent) modulated symbol for the UCI for the transmission thereof.

Figure 15:
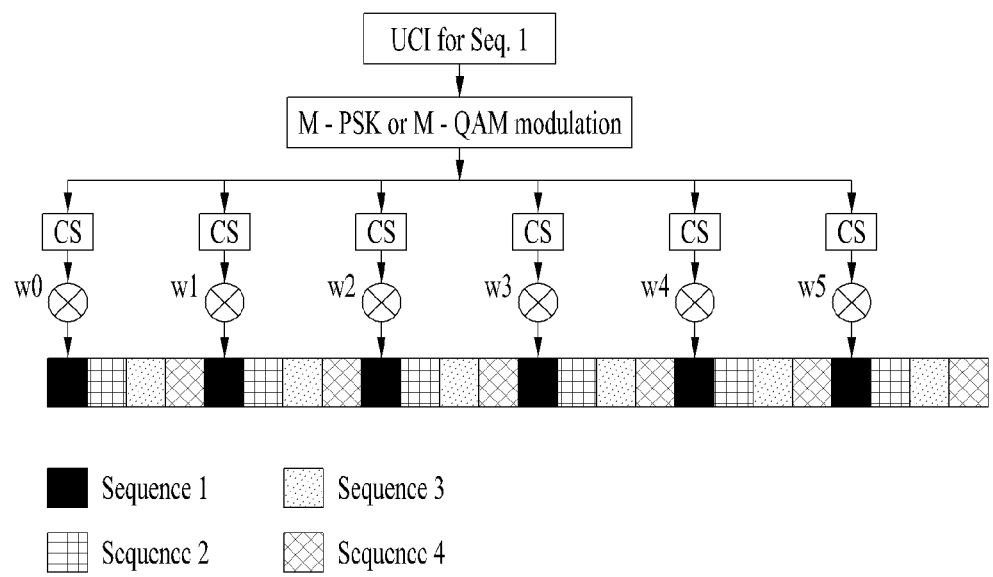
FIG. 15 is a diagram schematically illustrating a case in which the length of a PUCCH resource (N) is 24 and the PUCCH resource is configured by interleaving 4 length-6 sequences.

FIG. 15 is a diagram schematically illustrating a case in which the length of a PUCCH resource (N) is 24 and the PUCCH resource is configured by interleaving 4 length-6 sequences (i.e., M=4 and L=6).

In this case, if the sequence constituting the PUCCH is an OCC rather than a CAZAC sequence, the module for applying a CS may be omitted from FIG. 15. Instead, the values multiplied by w0, w1, . . . , wL (L=6 in FIG. 15) may represent a specific OCC.

Although FIG. 15 shows that sequence 1 is multiplied by a modulated symbol for UCI, this operation can also be applied when an independent modulated symbol for UCI is applied to each of all sequences except RS sequences.

When a PUCCH is configured as shown in FIG. 15, the RS and UCI of short PUCCH type A shown in FIG. 14 may be represented as sequence 1/3 to which a specific CS (or OCC) is applied and sequence 2/4 to which a specific CS (or OCC) is applied, respectively. In addition, the RS and UCI of short PUCCH type B shown in FIG. 14 may be represented as sequence 1 to which a specific CS (or OCC) is applied and sequence 2/3/4 to which a specific CS (or OCC) is applied, respectively. The CS or OCC applied to the sane sequence X (X=1, 2, 3, or 4) may vary depending on the short PUCCH type, either type A or type B. When the CS or OCC applied to the same sequence is changed as described above, the CDM between type A and type B may be supported.

In other words, the CDM between PUCCH resources having the PUCCH structure of PUCCH transmission and reception method 2-1 may be achieved by differently setting the CS or OCC applied to each sequence constituting the PUCCH for each PUCCH resource. Since the number of RS sequences among multiple sequences in the PUCCH resource does not affect the operation of applying the CS to each sequence, the CDM may be naturally applied between PUCCH resources having different RS/UCI ratios (i.e., between the PUCCH resources having the PUCCH structure of PUCCH transmission and reception method 2-1).

When the RS and UCI of short PUCCH type A shown in FIG. 14 are represented as sequence 1/3 to which the specific CS (or OCC) is applied and sequence 2/4 to which the specific CS (or OCC) is applied, respectively, a length-2 OCC may be applied to RS sequences, i.e., sequences 1 and 3. Similarly, the length-2 OCC may also be applied to sequences for UCI transmission, i.e., sequences 2 and 4.

Additionally, among $M_1$ sequences interleaved in the frequency domain (using interleaved frequency division multiple access (IFDMA) with a repetition factor set to $M_1$), only $M_2$ sequences may be configured as a PUCCH resource. In this case, some of the $M_2$ sequences on the PUCCH may be used for an RS, and the remaining sequences may be multiplied by modulated symbols for UCI for transmission thereof.

Figure 16:
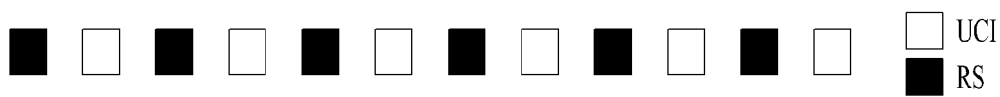
FIG. 16 is a diagram schematically illustrating a configuration in which an RS and a modulated symbol for UCI are transmitted on a PUCCH resource where only 2 sequences among 4 interleaved sequences are used.

FIG. 16 is a diagram schematically illustrating a configuration in which an RS and a modulated symbol for UCI are transmitted on a PUCCH resource where only 2 sequences among 4 interleaved sequences are used.

In the case of the PUCCH resource where only 2 sequences among 4 interleaved sequences are used (shown in FIG. 15), sequence 1 may be used for an RS, and sequence 3 may be multiplied by a modulated symbol for UCI for transmission thereof as shown in FIG. 16. Alternatively, sequence 2 may be used for the RS, and sequence 4 may be multiplied by the modulated symbol for the UCI for the transmission thereof.

Additionally, if all (or some) of the $M_1$ sequences interleaved in the frequency domain (using the IFDMA with the repetition factor set to $M_1$) are configured as a specific PUCCH resource, UCI may be represented by informing which sequence (having a specific CS value) is transmitted in $M_1$ sequence groups (having the same CS value) (or $M_2$ (<$M_1$) sequence groups among the $M_1$ sequence groups).

For example, assuming that a specific CS value is used in FIG. 15, 2-bit UCI may be represented by informing which one of the 4 sequences is transmitted with the corresponding CS value.

Alternatively, when a specific CS value is assumed, 1-bit UCI may be represented by informing which one of 2 specific sequences among the 4 sequences is transmitted with the corresponding CS value (in this case, two sequence groups may be allocated to two UEs, respectively).

The PUCCH resource capable of providing UCI by informing which sequence is transmitted is named 'sequence based PUCCH resource'. In this case, a BS may transmit to a UE information on CSs for sequences that the UE should monitor and information on sequence resources through a higher layer signal (e.g., RRC signaling) and/or a dynamic control signal (e.g., DCI, L1/L2 signaling, etc.).

PUCCH transmission and reception method 2-1 may be applied together with other proposed methods of the present disclosure unless they collide with each other.

3.2.2. PUCCH Transmission and Reception Method 2-2

When a UE is capable of transmitting an SRS, a BS may configure for the UE a specific resource set consisting of N (orthogonal) SRS resources. By selecting one SRS resource from among the N (orthogonal) SRS resources, the UE may transmit k-bit ACK/NACK information (where k=floor(log$_2$ (N)) to the BS.

The SRS resource may be defined in terms of a frequency band, a sequence (in particular, the root index and cyclic shift of a CAZAC sequence), and a comb index (e.g., even or odd). The BS may transmit information indicating which SRS resource relates to the k-bits ACK/NACK information to the UE through a higher layer signal (e.g., RRC signaling).

In addition, the operation of transmitting ACK/NACK based on the SRS resource may be triggered by a specific state of a bit field for indicating an ACK/NACK resource in DCI corresponding to DL assignment (hereinafter referred to as an ACK/NACK resource indicator (ARI)). That is, when the ARI in the DL assignment has multiple states, some of the multiple states may indicate specific PUCCH resources, and the specific state may indicate the ACK/NACK transmission operation based on the SRS resource.

In various wireless communication systems, a BS may instruct a UE to transmit an SRS for UL channel measurement. In general, since the SRS resource is used by multiple UEs, the SRS resource needs to be designed such that its multiplexing capacity is maximized.

Assuming that there are a large amount of SRS resources, some of them may be used to transmit ACK/NACK information. For example, it is assumed that an SRS is transmitted using a length-24 CAZAC sequence in 48 REs in an even or odd comb manner. If each CAZAC sequence has up to 8 different CS values, there may be a total of 16 SRS resources.

If the UE is allocated the 16 SRS resources for ACK/NACK transmission, the UE may report to the BS 4-bit ACK/NACK information using the 16 SRS resources as shown in Table 5 below.

TABLE 5

| | Comb Odd Comb CS | | | | | | | |
|---|---|---|---|---|---|---|---|---|
| | 0 | 1 | 2 | 3 | 4 | 5 | 6 | 7 |
| A/N | 0000 | 0001 | 0010 | 0011 | 0100 | 0101 | 0110 | 0111 |
| | Comb Even Comb CS | | | | | | | |
| | 0 | 1 | 2 | 3 | 4 | 5 | 6 | 7 |
| A/N | 1000 | 1001 | 1010 | 1011 | 1100 | 1101 | 1110 | 1111 |

PUCCH transmission and reception method 2-2 may be applied together with other proposed methods of the present disclosure unless they collide with each other.

3.3. PUCCH Transmission and Reception Method 3

In this section, a PUCCH design method capable of transmitting the UCI payload size proportional to the amount of (frequency-domain) resources for a PUCCH when the amount of (frequency-domain) resources is changed and maintaining the number of PUCCH resources where CDM is applicable and the low PAPR characteristics and a PUCCH transmission and reception method based thereon will be described in detail.

In the NR system to which the present disclosure is applicable, a PUCCH needs to have a structure capable of supporting multiplexing between PUCCH resources transmitted from a plurality of UEs as much as possible for the purpose of efficient use of UL resources.

For example, similar to PUCCH Format 2/2a/2b of the legacy LTE system, the NR system may support a format where a PUCCH resource is composed of a plurality of symbols and a (frequency-domain) CAZAC sequence is transmitted in each symbol of the PUCCH resource.

In this case, CAZAC sequences transmitted in specific symbols of the PUCCH resource may be multiplied by modulated symbols for UCI, and CAZAC sequences transmitted in the remaining symbols may be used for an RS.

In the present disclosure, a PUCCH structure where a PUCCH resource consists of a plurality of symbols and a sequence multiplied by a modulated symbol for UCI or a sequence (used for an RS) is transmitted in each symbol is named 'sequence modulation based PUCCH'. In this case, a CAZAC sequence or a sequence in an orthogonal sequence group may be used as the per-symbol sequence. Further, the same sequence or an independent (different) sequence may be used for each symbol.

If the sequence modulation based PUCCH is composed of CAZAC sequences, different CS resources are applied to CAZAC sequences on different PUCCH resources, and thus CDM of PUCCH resources may be supported.

Figure 17:
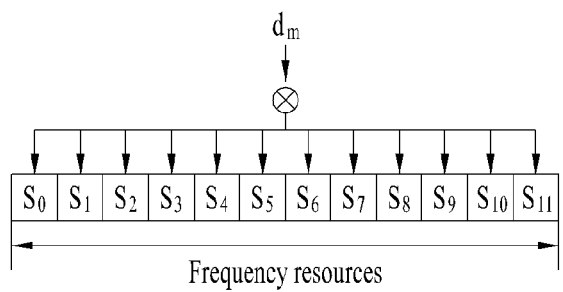
FIG. 17 is a diagram schematically illustrating a process in which UCI is transmitted in one symbol of PUCCH format 2 of the legacy LTE system.

FIG. 17 is a diagram schematically illustrating a process in which UCI is transmitted in one symbol of PUCCH format 2 of the legacy LTE system.

It is assumed that the NR system to which the present disclosure is applicable supports a PUCCH structure capable of increasing a transmittable UCI payload size two times by increasing the amount of PUCCH resources while maintaining multiplexing capacity based on CDM. As a simple method, it may be considered that two frequency-domain PUCCH resources are used as resources for the sequence modulation based PUCCH, and independent UCI is transmitted on each PUCCH resource. However, when the sequence modulation based PUCCH is configured with CAZAC sequences, if UCI is transmitted using two frequency-domain PUCCH resources, the CAZAC sequences may be repeated in the frequency domain. As a result, the "zero-insertion" effect may appear in the time domain. Thus, the PAPR may increase by about 3 dB compared to before increasing the amount of frequency-domain resources two times.

To solve such a problem, a PUCCH design method of maintaining the number of PUCCH resources where CDM is applicable and the low PAPR characteristics while transmitting the UCI payload size proportional to the amount of (frequency-domain) resource for a PUCCH when the amount of (frequency-domain) resources is changed and a PUCCH transmission and reception method based thereon will be described in detail in this section.

3.3.1. PUCCH Transmission and Reception Method 3-1

When a UE configures a PUCCH (PUCCH 2) with frequency-domain resources N times as many as those of a sequence modulation based PUCCH (PUCCH 1), which is generated based on a length-L sequence, the UE may transmit UCI in a specific symbol of PUCCH 2 as follows.

(1) A length-N*L sequence (SEQ$_{REF}$) is generated by repeating a specific length-L (base) sequence N times.

(2) N length-N*L sequences (SEQ$_0$, SEQ$_1$, ..., SEQ$_{N-1}$) are generated by applying N phase rotations to SEQ$_{REF}$.

In this case, the N phase rotations may be defined according to one of the following options.

i. Option 1: An n-th phase rotation (n=0, 1, ..., N−1) may be defined such that a k-th element (k=0, 1, ..., N*L) of a specific length-N*L sequence is multiplied by exp(2π*j*n*k/(N*L)), where j is the square root of −1.

ii. Option 2: An n-th phase rotation (n=0, 1, ..., N−1) may be defined such that a k-th element (k=0, 1, ..., N*L) of a specific length-N*L sequence is multiplied by exp(2π*j*n*floor(k/L)/N), where j is the square root of −1 and floor( ) indicates a round-down function.

(3) For SEQ$_n$ (n=0, 1, ..., N−1), each sequence is multiplied by an (independent) modulated symbol for UCI, and a k-th element (k=0, 1, ..., N*L−1) of the sequence is transmitted using a frequency-domain resource corresponding to subcarrier index (u$_0$+k), where u$_0$ may be configured by a BS or predetermined.

The specific length-L sequence may be a CAZAC sequence.

The BS may transmit to the UE information on the length of the (base) sequence for configuring PUCCH 2 (e.g., L) and information on the number of times that the (base) sequence is repeated (e.g., N) through a higher layer signal such as RRC signaling or a (L1/L2) dynamic control signal such as DCI.

This operation may be applied when the UE increases not only the frequency-domain resources for UCI but also the frequency-domain resources for an RS. In the latter case, a sequence may not be multiplied by a modulated symbol.

More specifically, it is assumed that the UE transmits a data modulation symbol using (frequency-domain) resource two times as many as those in the example shown in FIG. 17. In this case, according to PUCCH transmission and reception method 3-1, the UE may repeat a length-12 CAZAC sequence two times, apply two different phase rotations thereto, generate two length-24 sequences, and then perform transmission by multiplying the two sequences by two data modulation symbols, d$_m$(0) and d$_m$(1), respectively (when option 2 in section (2) of PUCCH transmission and reception method 3-1 is applied).

Figure 18:
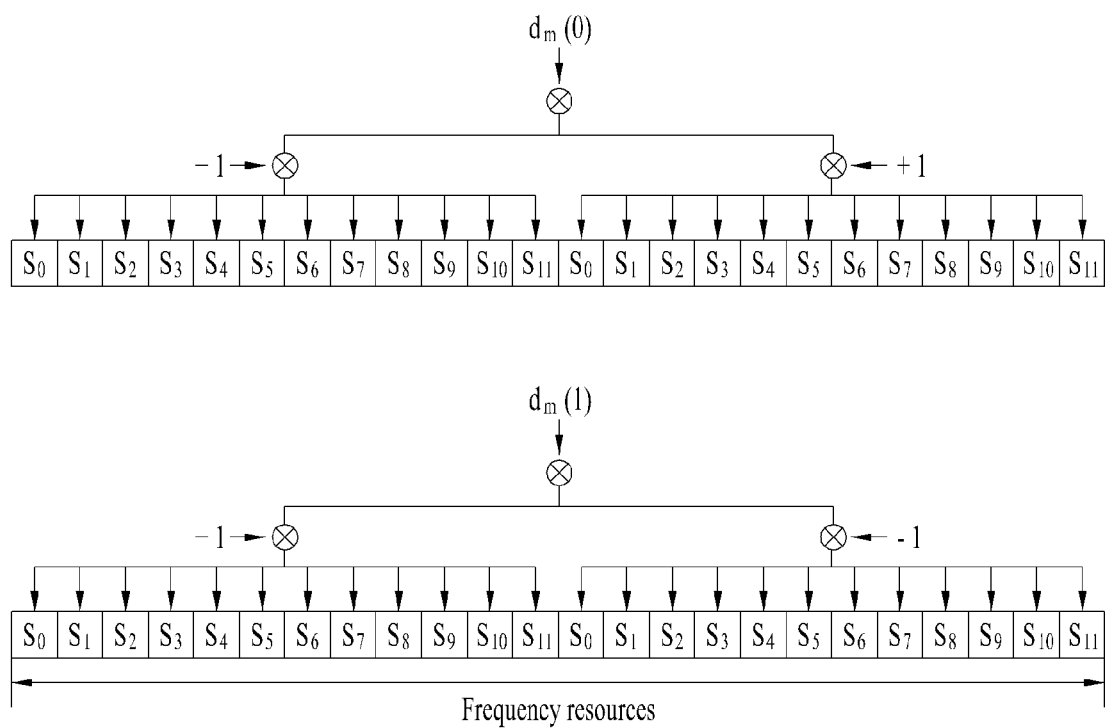
FIG. 18 is a diagram schematically illustrating a PUCCH design method suitable for PUCCH transmission and reception method 3-1 of the present disclosure.

FIG. 18 is a diagram schematically illustrating a PUCCH design method suitable for PUCCH transmission and reception method 3-1 of the present disclosure.

In FIG. 18, the frequency resource region in which d$_m$(0) is transmitted is identical to the frequency resource region in which d$_m$(1) is transmitted. The time-domain resource for transmitting d$_m$(0) and the time-domain resource for transmitting d$_m$(1) may be included in different interlace resources (or time-domain comb resources) by phase rotations.

In other words, the UE may form a comb resource structure (or interlace resource structure) in the time domain by repeating a sequence in the frequency domain and then generate a plurality of sequences, which are distinguished as different comb resources in the time domain, by applying different phase rotations to the repeated sequence. Thereafter, the UE may perform transmission by multiplying each of the plurality of sequences by an (independent) data modulation symbol.

When the UE configures a PUCCH as described above, since a specific base sequence is repeatedly transmitted (in the frequency domain) although the amount of (frequency-domain) resources increase N times, CDM of PUCCH resources as many as the number of CS resources applied to the sequence may be supported (regardless of the amount of frequency-domain resources) (that is, the CDM-based multiplexing capacity is maintained constantly regardless of the amount of frequency-domain resources). In addition, since the number of sequences transmitted on the same frequency-domain resource increases up to N as the amount of (frequency-domain) resources increase N times, the transmittable UCI payload size also increase N times in proportion to the amount of (frequency-domain) resources. Moreover, since different phase rotations are applied to the N sequences, the N sequences may be transmitted in different comb resources in the time domain, thereby maintaining the almost same PAPR characteristics compared to before increasing the amount of resources N times.

PUCCH transmission and reception method 3-1 may be applied together with other proposed methods of the present disclosure unless they collide with each other.

3.3.2. PUCCH Transmission and Reception Method 3-2

When a UE configures a PUCCH (PUCCH 2) with frequency-domain resources N times as many as those of a sequence modulation based PUCCH (PUCCH 1), which is generated based on a length-L sequence, the UE may transmit UCI in a specific symbol of PUCCH 2 as follows.

(1) A length-N*L$_{NEW}$ (L$_{NEW}$=L/N) sequence (SEQ(n)$_{REF}$, where n=0, 1, ..., N−1) is generated by repeating N specific length-L$_{NEW}$ (base) sequences N times per sequence.

(2) N length-N*L$_{NEW}$ sequences (SEQ$_0$, SEQ$_1$, ..., SEQ$_{N-1}$) are generated by applying an n-th phase rotation among N phase rotations to SEQ$_{REF}$(n). In this case, the N phase rotations may be defined according to one of the following options.

i. Option 1: The n-th phase rotation (n=0, 1, ..., N−1) may be defined such that a k-th element (k=0, 1, ..., N*L$_{NEW}$) of a specific length-N*L$_{NEW}$ sequence is multiplied by exp(2π*j*n*k/(N*L$_{NEW}$)), where j is the square root of −1.

ii. Option 2: The n-th phase rotation (n=0, 1, ..., N−1) may be defined such that a k-th element (k=0, 1, ..., N*L$_{NEW}$) of a specific length-N*L sequence is multiplied by Exp(2π*j*n*floor(k/L$_{NEW}$)/N), where j is the square root of −1 and floor( ) indicates a round-down function.

(3) For SEQ$_n$ (n=0, 1, ..., N−1), each sequence is multiplied by an (independent) modulated symbol for UCI, and a k-th element (k=0, 1, ..., N*L$_{NEW}$−1) of the sequence is transmitted using a frequency-domain resource corresponding to subcarrier index (u o+N*k+n).

In this case, u$_0$ may be configured by a BS or predetermined. The specific length-L$_{NEW}$ sequence may be a CAZAC sequence. The BS may transmit to the UE information on the length of the (base) sequence for configuring PUCCH 2 (e.g., L or L$_{NEW}$) and information on the number of times that the (base) sequence is repeated (e.g., N) through a higher layer signal such as RRC signaling or a (L1/L2) dynamic control signal such as DCI.

This operation may be applied when the UE increases not only the frequency-domain resources for UCI but also the frequency-domain resources for an RS. In the latter case, a sequence may not be multiplied by a modulated symbol.

More specifically, it is assumed that the UE transmits a data modulation symbol using (frequency-domain) resource two times as many as those in the example shown in FIG. 17. In this case, according to PUCCH transmission and reception method 3-2, the UE may repeat two length-6 (12/2=6) CAZAC sequences (SEQ0 and SEQ1) two times, respectively apply corresponding phase rotations to the repeated sequences, and then generate a total of two length-12 sequences. Thereafter, the UE may multiply the two sequences by two data modulation symbols, d$_m$(0) and $d_m(1)$, respectively and then transmit the two data modulation symbols alternately in the frequency domain (when option 2 in section (2) of PUCCH transmission and reception method 3-2 is applied).

Figure 19:
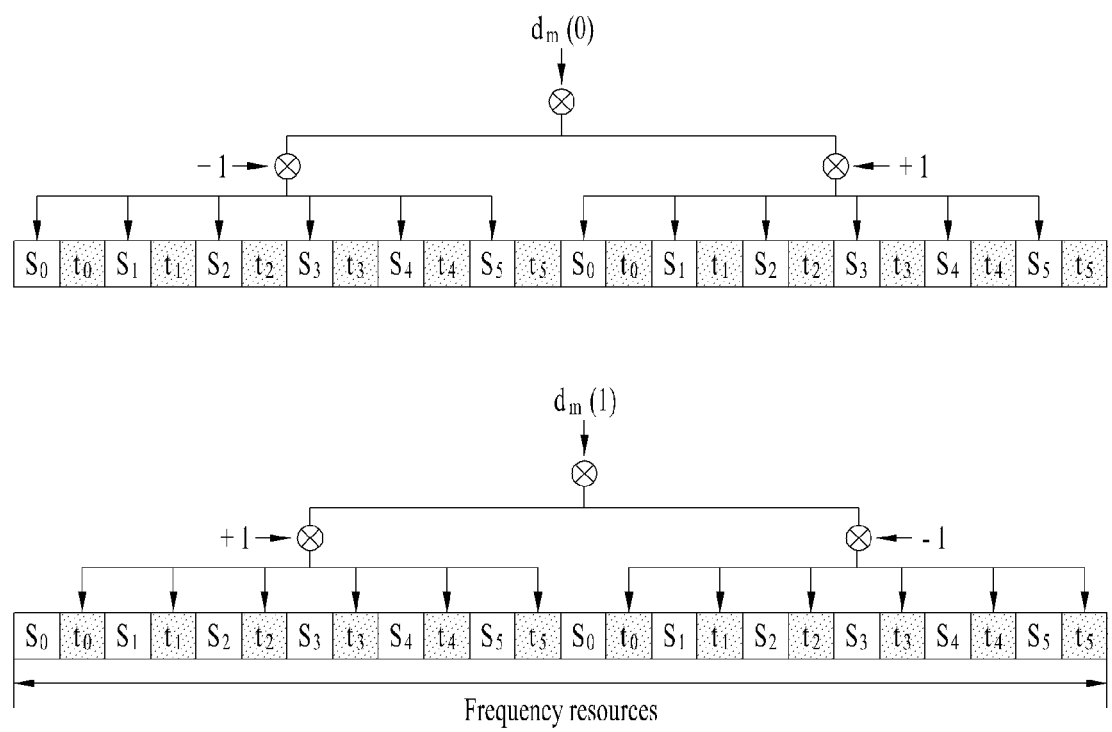
FIG. 19 is a diagram schematically illustrating a PUCCH design method suitable for PUCCH transmission and reception method 3-2 of the present disclosure.

FIG. 19 is a diagram schematically illustrating a PUCCH design method suitable for PUCCH transmission and reception method 3-2 of the present disclosure.

According to PUCCH transmission and reception method 3-2, sequences are FDM in a repeated transmission unit. Thus, assuming that the same frequency-domain resources are used in PUCCH transmission and reception methods 3-1 and 3-2, PUCCH transmission and reception method 3-2 may have a disadvantage in that the amount of PUCCH resources where CDM is applicable is reduced because the length of a sequence decreases, compared to PUCCH transmission and reception method 3-1. However, PUCCH transmission and reception method 3-2 may have an advantage over PUCCH transmission and reception method 3-1 in that different UCI transmission sequences are used in the frequency domain so that power spectral density (PSD) is uniformly distributed in the frequency domain.

PUCCH transmission and reception method 3-2 may be applied together with other proposed methods of the present disclosure unless they collide with each other.

3.3.3. PUCCH Transmission and Reception Method 3-2

When a UE is configured with a sequence modulation based PUCCH in a resource region composed of M symbols and L subcarriers, the actual number of symbols used for PUCCH transmission may be less than M. In this case, the UE may increase frequency-domain resources in each symbol (or specific symbols) of the PUCCH N times according to at least one of the following rules and then configure a signal for UCI (or RS) transmission on the N-fold increased frequency-domain resources according to PUCCH transmission and reception method 3-1 (or PUCCH transmission and reception method 3-2).

(1) If a difference between the actual number of transmission symbols and M is equal to or less than a predetermined value, the frequency-domain resources increase N times.

(2) If a difference between a coding rate based on the actual number of transmission symbols and a coding rate based on the number of symbols M is more than a predetermined value, the frequency-domain resources increase N times.

If the increased frequency-domain resources are for RS transmission, the UE does not use PUCCH transmission and reception method 3-1 or 3-2 but may apply a new sequence with a longer length.

More specifically, it is assumed that the sequence modulation based PUCCH is configured to carry signals in the form of [UCI, RS, UCI, UCI, RS, UCI] using 7 symbols in each of two slots as in PUCCH format 2 of the LTE system. In this case, if the actual number of transmission symbols of the sequence modulation based PUCCH is reduced to 7 due to a specific environment and/or condition, a transmittable UCI payload size is also reduced by half.

To prevent a change in the UCI payload size when the number of transmission symbols of the PUCCH is reduced, the UE may increase the amount of frequency-domain resources. When the number of transmission symbols of the PUCCH is reduced from 14 to 7 as in the above example, the UE may increase the amount of frequency-domain resources two times in each symbol of the PUCCH. In this case, to maintain the CDM-based multiplexing capacity and low PAPR characteristics, the UE may configure a signal for UCI (or RS) transmission on the PUCCH where the amount of frequency-domain resources is doubled according to PUCCH transmission and reception method 3-1 (or PUCCH transmission and reception method 3-2).

PUCCH transmission and reception method 3-3 may be applied together with other proposed methods of the present disclosure unless they collide with each other.

3.3.4. PUCCH Transmission and Reception Method 3-4

It is assumed that the UCI transmission region of a PUCCH is divided into M transmission units (each having a frequency-domain length of L) in the frequency domain, UCI is mapped to the M transmission units by being repeated M times, and a length-M frequency-domain OCC is applied to the M transmission units for transmission. In this case, to scales down the resource region of the PUCCH 1/N times in the time domain and scales up the resource region of the PUCCH N times in the frequency domain, a UE may use one of the following methods.

(1) A method of increasing N times the frequency-domain length of the transmission unit to which the OCC is applied while maintaining the OCC length In this case, the UCI transmission region of the PUCCH may be divided into M transmission units (each having a length of N*L) in the frequency domain, the UCI may be mapped to the M transmission units by being repeated M times, and the length-M frequency-domain OCC may be applied to the M transmission units for transmission.

(2) A method of maintaining both of the OCC length and the frequency-domain length of the transmission unit to which the OCC is applied In this case, the UCI transmission region of the PUCCH may be divided into N*M transmission units (each having a length of L) in the frequency domain, the UCI which is independent for every M transmission units may be mapped to the M transmission units by being repeated M times, and the length-M frequency-domain OCC may be applied to the M transmission units for transmission. Accordingly, a total of N pieces of independent UCI may be transmitted.

The UCI may be a sequence or coded bits (or a coded symbol).

When DFT precoding (or DFT spreading) is applied to the UCI, the frequency-domain OCC may mean an OCC applied to a virtual frequency region before the DFT precoding.

More specifically, it is assumed that a QPSK modulation symbol is transmitted in each RE in a PUCCH resource region composed of 2 symbols and 12 subcarriers and a length-2 frequency-domain OCC is applied. In this case, the (frequency-domain) length of a frequency-domain transmission unit to which the OCC is applied may correspond to 6 subcarriers, and a maximum of 24 coded bits (24=2 (modulated order)×6 (frequency-domain length of transmission unit to which OCC is applied)×2 (number of symbols)) may be transmitted.

In this case, it is assumed that the resource region is scaled down ½ times in the time domain and scaled up 2 times in the frequency domain (i.e., 1 symbol and 24 subcarriers).

If the UE increases the OCC length to 4 as the amount of frequency-domain resources increases, the number of coded bits that can be transmitted in the scaled resource region becomes 2*24/4=12 bits. As a result, there occurs a problem that the number of transmittable coded bits is changed even though the resource region is composed of the same REs.

To solve this problem, a method of increasing N times the (frequency-domain) length of a frequency-domain transmission unit to which a frequency-domain OCC is applied while maintaining the length of the OCC when scaling capable of maintaining the total number of REs is applied will be described in detail in this section.

If PUCCH transmission and reception method 3-4 is applied, the frequency-domain OCC length is maintained as 2, the (frequency-domain) length of the frequency-domain transmission unit to which the OCC is applied increases to 12 subcarriers, and the number of coded bits that can be transmitted in the scaled resource region is maintained as 24 bits (24=2 (modulated order)×12 (frequency-domain length of transmission unit to which OCC is applied)×1 (number of symbols)).

Figure 20:
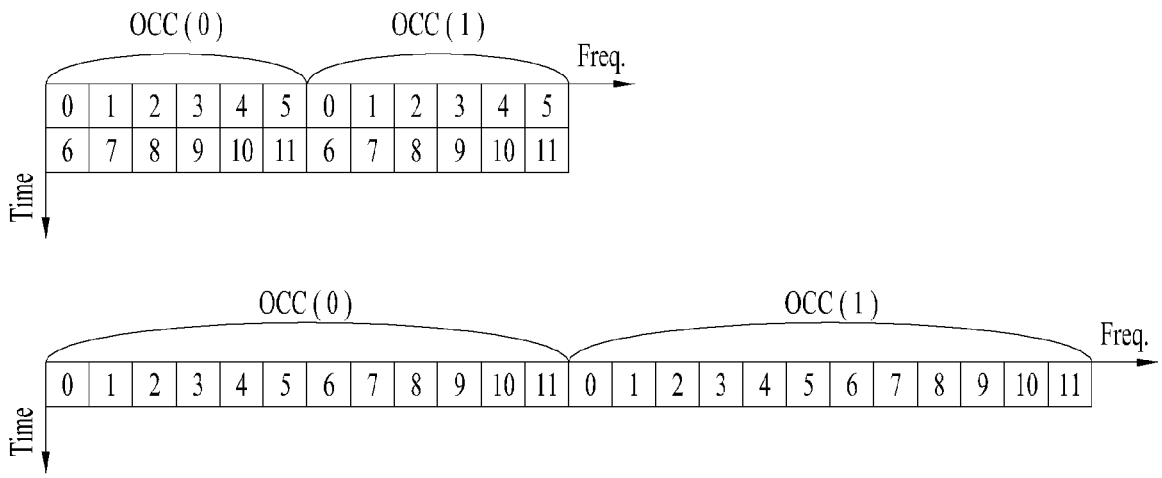
FIG. 20 is a diagram schematically illustrating a PUCCH design method suitable for PUCCH transmission and reception method 3-4 of the present disclosure.

FIG. 20 is a diagram schematically illustrating a PUCCH design method suitable for PUCCH transmission and reception method 3-4 of the present disclosure. In FIG. 20, {OCC(0), OCC(1)} corresponds to an OCC, and each may have a value of {+1 +1} or {+1 −1}.

Alternatively, if a (reference) PUCCH resource region to which a frequency-domain OCC is applied is capable of being scaled down 1/N times in the time domain and scaled up N times in the frequency domain, a method of maintaining the length of the frequency-domain OCC and the (frequency-domain) length of a frequency-domain transmission unit to which the OCC is applied in the scaled PUCCH resource region may be considered (however, in this case, independent coded bits may be transmitted in each region to which the OCC is applied).

For example, if a UE transmits a QPSK modulation symbol in each RE in a PUCCH resource region composed of 2 symbols and 12 subcarriers and applies a length-2 frequency-domain OCC, the UE may transmit a maximum of 24 coded bits (24=2 (modulated order)×6 (frequency-domain length of transmission unit to which OCC is applied)×2 (number of symbols)).

It is assumed that the UE scales down the resource region ½ times in the time domain and scales up the resource region 2 times in the frequency domain (i.e., 1 symbol and 24 subcarriers). In this case, the frequency-domain OCC length may be maintained as 2, and the (frequency-domain) length of the frequency-domain transmission unit to which the OCC is applied may be maintained as 6 subcarriers. Since there are 2 regions (24/(2×6)=2) where the length-2 OCC is applicable and 12 bits (12=2 (modulated order)×6 (frequency-domain length of transmission unit to which OCC is applied)×1 (number of symbols)) can be transmitted in each region, the UE may transmits a total of 24 bits (24=2×12) in the two regions.

Figure 21:
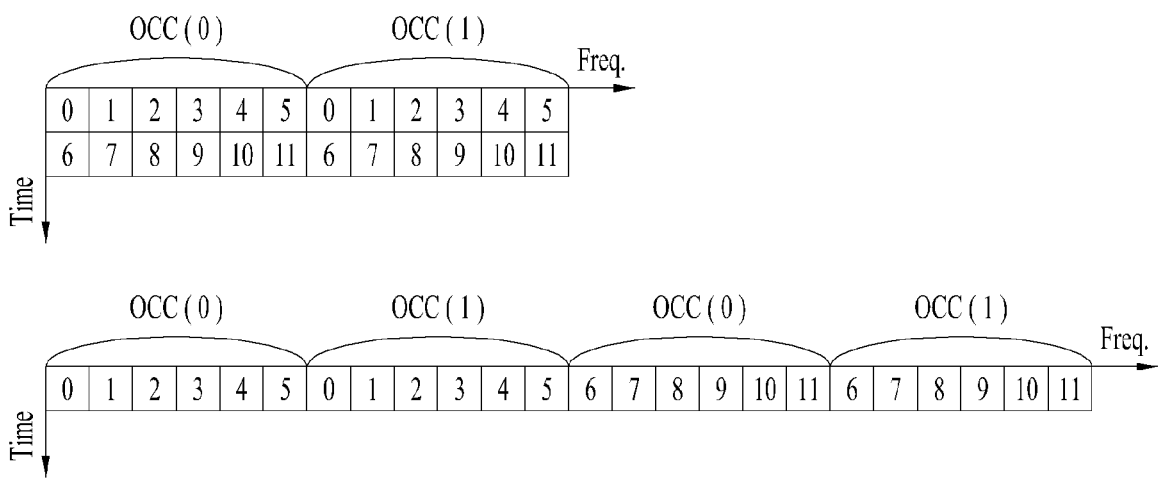
FIG. 21 is a diagram schematically illustrating another PUCCH design method suitable for PUCCH transmission and reception method 3-4 of the present disclosure.

FIG. 21 is a diagram schematically illustrating another PUCCH design method suitable for PUCCH transmission and reception method 3-4 of the present disclosure.

Additionally, regarding a PUCCH structure where a modulated symbol for UCI is transmitted in a sequence (through multiplication by a sequence) (similar to LTE PUCCH format 2) or a PUCCH structure where a modulated symbol for UCI is transmitted in a sequence (through multiplication by a sequence) (similar to LTE PUCCH format 2) in PUCCH transmission and reception methods 3-1 to 3-4, the amount of frequency-domain resources in a single PUCCH resource may be determined as follows.

1) Alt 1: The Amount of Frequency-Domain Resources (e.g., the Number of PRBs) Constituting a PUCCH May be Determined with Respect to a Specific UCI Code Rate (R).

For example, the number of PRBs K may be determined such that a UCI code rate calculated from the number of UCI symbols allocated as a PUCCH resource N and the number PRBs K does not exceed R but becomes the maximum code rate. Accordingly, as the number of symbols constituting the PUCCH decreases, the value of K may increase.

As another example, when the number of PRBs K (e.g., 1) is configured with respect to the number of specific UCI symbols N (e.g., 10 or 12) (in this case, the UCI code rate is equal to or less than R), if the number of UCI symbols allocated as the PUCCH resource becomes less than N and the UCI code rate becomes more than R due to combination with the number of PRBs K, the number of PRBs constituting the PUCCH may be more than K.

2) Alt 2: The Amount of Frequency-Domain Resources (e.g., the Number of PRBs) Constituting a PUCCH May be Determined with Respect to the Number of Specific UCI Symbols (L).

For example, as the number of UCI symbols allocated as a PUCCH resource N increases, the number of PRBs constituting the PUCCH may decrease. In other words, as the number of allocated UCI symbols N decreases, the number of PRBs constituting the PUCCH may increase.

As another example, when the number of UCI symbols allocated as the PUCCH resource N is equal to or more than L (e.g., 10 or 12), the number of PRBs constituting the PUCCH may be set to K (e.g., 1). When the number of allocated UCI symbols N is less than L, the number of PRBs constituting the PUCCH may become more than K.

When a UE increases the amount of frequency-domain resources for a PUCCH according to one of PUCCH transmission and reception methods 3-1 to 3-4, the UE may increase the amount of frequency-domain resources for RS transmission in the same manner as that used for increasing the amount of frequency-domain resources for UCI transmission. Alternatively, the UE may use a new RS sequence having a length suitable for the increased amount of frequency-domain resources.

In the present disclosure, the application of a frequency-domain (F-domain) OCC may mean that when DFT is applied to a UCI signal, the OCC is applied in a virtual frequency domain before the DFT. When no DFT is applied to the UCI signal, it may mean that the OCC is applied in the (real) frequency domain before IFFT.

PUCCH transmission and reception method 3-4 may be applied together with other proposed methods of the present disclosure unless they collide with each other.

3.3.5. PUCCH Transmission and Reception Method 3-5

When a DM-RS of a PUCCH is configured with a CAZAC sequence, the length of the DM-RS sequence may vary in proportion to the amount of frequency-domain resources allocated for the PUCCH. In this case, a UE may configure a predetermined number of (valid) CS resources as follows.

(1) The predetermined number of (valid) CS resources are configured at a CS interval in proportion to the DM-RS sequence length.

For example, assuming that the DM-RS sequence length is N and the CS interval between (valid) CS resources is L, the CS interval between (valid) CS resources may be set to L*M if the DM-RS sequence length is changed to N*M.

(2) The (valid) CS resources are configured at a fixed CS interval or a CS interval configured by a BS.

Except for the (valid) CS resources for the DM-RS sequence, the remaining CS resources may be used for (sequence-based) UCI transmission of another UE.

In the above configuration, the CS may mean a CS in the time (or frequency) domain. In addition, the (valid) CS resources for a PUSCH DM-RS may be used for multiplexing between multiple PUSCHs.

More specifically, when the length of a PUCCH DM-RS is 12, the shift values of {0, 1, . . . , 11} may be considered as total CS resources. In this case, 4 CS resources, for example, {0, 3, 6, 9} may be selected as (valid) CS resources for supporting multiplexing of different PUCCH DM-RS s.

The PUCCH DM-RS length may increase to 24 if frequency-domain resources are further allocated. Accordingly, although the total CS resources are given as {0, 1, 2, . . . , 23}, the number of (valid) CS resources may be maintained as 4, and thus, multiplexing of 4 UEs can be supported.

For example, when the CS interval between CS resources is uniform, 4 (valid) CS resources may be allocated as follows: {0, 6, 12, 18}. According to this method, the CS interval between (valid) CS resources may vary in proportion to the amount of resources allocated for the PUCCH DM-RS.

Alternatively, if the delay spread of a channel is not large, (valid) CS resources may be configured with the CS interval configured by the BS. For example, when the CS interval is set to 3, a UE may set the 4 CS resources of {0, 3, 6, 9} as the (valid) CS resources. In this case, the CS resources {12, 15, 18, 21} may be orthogonal to other CS resources. Thus, the CS resources may be used for (sequence based) UCI transmission of another UE. For example, the other UE may transmit a signal by selecting one sequence from {12, 15, 18, 21} to send 2-bit UCI to the BS.

PUCCH transmission and reception method 3-5 may be applied together with other proposed methods of the present disclosure unless they collide with each other.

Figure 22:
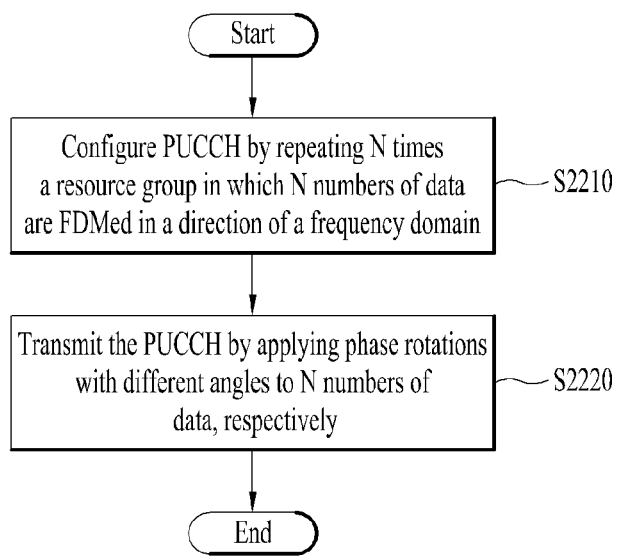
FIG. 22 is a flowchart schematically illustrating a PUCCH transmission method according to the present disclosure.

FIG. 22 is a flowchart schematically illustrating a PUCCH transmission method according to the present disclosure.

First, a UE may configure a PUCCH by repeating N times a resource group in which N pieces of data are FDM in the frequency domain in each of at least one symbol (where N is an integer greater than 1) (S2210). By doing so, the PUCCH may be configured as shown FIG. 11 or 12.

Next, the UE may transmit the configured PUCCH in the at least one symbol after applying phase rotations with different angles to the N pieces of data, respectively (S2220).

The N pieces of data may include M DM-RSs and (N-M) pieces of UCI (where M is an integer).

For example, when M is 1, one DM-RS may be transmitted in the at least one symbol after a phase rotation of zero degrees is applied to the one DM-RS.

The N pieces of data may be respectively allocated to REs spaced at a predetermined subcarrier spacing in the resource group and FDM with each other in each of at least one symbol.

Configuring the PUCCH by repeating N times the resource group in the frequency domain may include configuring the PUCCH by repeating N times the resource group on consecutive resources in the frequency domain.

For example, when N is 2, the N pieces of data may include one DM-RS and one piece of UCI. In this case, in each of the at least one symbol, the number of resources allocated for the one piece of UCI in the resource group is equal to or greater than the number of resources allocated for the one DM-RS in the resource group.

In the above configuration, the number of the at least one symbol may be 1 or 2. In summary, the UE may configure and transmit a short PUCCH as described above.

To respond to the UE operation, a BS may receive a PUCCH as follows.

First, the BS may receive the PUCCH in at least one symbol. The PUCCH is configured by repeating N times a resource group in which N pieces of data are FDM in the frequency domain in each of the at least one symbol (where N is an integer greater than 1). Next, the BS may decode the N pieces of data received in the at least one symbol by applying phase rotations with different angles to the N pieces of data, respectively.

In this case, decoding the N pieces of data received in the at least one symbol may include obtaining M DM-RSs and obtaining (N-M) pieces of UCI based on the phase rotations with different angles respectively applied to the M DM-RSs and the (N-M) pieces of UCI.

Since each of the examples of the proposed methods may be included as a method for implementing the present disclosure, it is apparent that each example may be regarded as a proposed method. In addition, although the proposed methods may be implemented independently, some of the proposed methods may be combined (or merged) for implementation. Moreover, a rule may be defined such that information on whether the proposed methods are applied (or information on rules related to the proposed methods) should be transmitted from a BS to a UE through a predefined signal (e.g., a physical layer signal, a higher layer signal, etc.).

4. Device Configuration

FIG. 23 is a diagram the configurations of a UE and a BS for implementing the proposed embodiments. That is, the UE and BS illustrated in FIG. 23 operate to implement the above-described embodiments of the PUCCH transmission and reception method between a UE and a BS.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above-described configuration, the UE 1 configures a PUCCH through the processor 40 by repeating N times a resource group in which N pieces of data are FDM in the frequency domain in each of at least one symbol (where N is an integer greater than 1). Then the UE 1 transmits the configured PUCCH in the at least one symbol through the transmitter 120 after applying phase rotations with different angles to the N pieces of data, respectively.

The BS 100 receives a PUCCH in at least one symbol through the receiver 120. The PUCCH is configured by repeating N times a resource group in which N pieces of data are FDM in the frequency domain in each of the at least one symbol (where N is an integer greater than 1). Then, the BS decodes the N pieces of data received in the at least one symbol by applying phase rotations with different angles to the N pieces of data, respectively.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting a physical uplink control channel (PUCCH) to a base station (BS) by a user equipment (UE) in a wireless communication system, the method comprising:
configuring the PUCCH by repeating N times a resource group in which N numbers of data are frequency division multiplexed (FDMed) in a direction of a frequency domain with respect to each of at least one symbol, where N is an integer greater than 2; and
transmitting the configured PUCCH in the at least one symbol by applying phase rotations with different angles to the N numbers of data, respectively,
wherein the N numbers of data includes one demodulation reference signal (DM-RS) and N−1 number of uplink control information, the N−1 is an integer greater than 1,
wherein the one DM-RS is allocated to one interlace among N interlaces, and the uplink control information is allocated to N−1 interlaces among the N interlaces, the N−1 interlaces being different than the one interlace of the one DM-RS, and
wherein the one DM-RS is transmitted in the one interlace with no phase rotation, and the N−1 number of uplink control information are transmitted in corresponding ones of the N−1 interlaces with corresponding different non-zero phase rotation angles.

2. The method of claim 1, wherein each of the N numbers of data are FDMed being allocated to resource elements (REs) spaced at a predetermined subcarrier spacing in the resource group with respect to each of the at least one symbol.

3. The method of claim 1, wherein the at least one symbol is 1 symbol or 2 symbols.

4. A method of receiving a physical uplink control channel (PUCCH) from a user equipment (UE) by a base station (BS) in a wireless communication system, the method comprising:
receiving the PUCCH via at least one symbol,
wherein the PUCCH is configured by repeating N times a resource group in which N numbers of data are frequency division multiplexed (FDMed) in a direction of a frequency domain with respect to the each of the at least one symbol, where N is an integer greater than 2; and
decoding the N numbers of data received in the at least one symbol by applying phase rotations with different angles to the N numbers of data, respectively,
wherein the N numbers of data includes one demodulation reference signal (DM-RS) and N−1 number of uplink control information, the N−1 is an integer greater than 1,
wherein the one DM-RS is allocated to one interlace among N interlaces, and the uplink control information is allocated to N−1 interlaces among the N interlaces, the N−1 interlaces being different than the one interlace of the one DM-RS, and
wherein the one DM-RS is transmitted in the one interlace with no phase rotation, and the N−1 number of uplink control information are transmitted in corresponding ones of the N−1 interlaces with corresponding different non-zero phase rotation angles.

5. The method of claim 4, wherein each of the N numbers of data are FDMed being allocated to resource elements (REs) spaced at a predetermined subcarrier spacing in the resource group with respect to each of the at least one symbol.

6. The method of claim 4, wherein the at least one symbol is 1 symbol or 2 symbols.

7. A user equipment (UE) for transmitting a physical uplink control channel (PUCCH) to a base station (BS) in a wireless communication system, the UE comprising:
a transmitter; and
a processor connected to the transmitter, wherein the processor is configured to:
configure the PUCCH by repeating N times a resource group in which N numbers of data are frequency division multiplexed (FDMed) in a direction of a frequency domain with respect to each of at least one symbol, where N is an integer greater than 2; and
transmit the configured PUCCH in the at least one symbol by applying phase rotations with different angles to the N numbers of data, respectively,
wherein the N numbers of data includes one demodulation reference signal (DM-RS) and N−1 number of uplink control information, the N−1 is an integer greater than 1,
wherein the one DM-RS is allocated to one interlace among N interlaces, and the uplink control information is allocated to N−1 interlaces among the N interlaces, the N−1 interlaces being different than the one interlace of the one DM-RS, and
wherein the one DM-RS is transmitted in the one interlace with no phase rotation, and the N−1 number of uplink control information are transmitted in corresponding ones of the N−1 interlaces with corresponding different non-zero phase rotation angles.

8. The UE of claim 7, wherein the UE communicates with at least one of a mobile terminal, a network or an autonomous vehicle.

* * * * *